United States Patent [19]

Easterly et al.

[11] Patent Number: 5,038,216

[45] Date of Patent: Aug. 6, 1991

[54] AUTOMATIC BRIGHTNESS ALGORITHM IN A SLIDE TO VIDEO TRANSFER UNIT

[75] Inventors: Robert W. Easterly, Churchville; John R. Fredlund, Rochester, both of N.Y.

[73] Assignee: Eastman Kodak Company, Rochester, N.Y.

[21] Appl. No.: 341,455

[22] Filed: Apr. 20, 1989

[51] Int. Cl.⁵ .............................................. H04N 3/36
[52] U.S. Cl. ...................... 358/228; 358/54; 358/214
[58] Field of Search .................. 358/213.19, 228, 214, 358/54, 55; 354/400, 402

[56] References Cited

U.S. PATENT DOCUMENTS

| 4,037,254 | 7/1977 | Monahan | 358/228 |
| 4,331,979 | 5/1982 | Bendell | 358/214 |
| 4,542,403 | 9/1985 | Zimmermann et al. | 358/228 |
| 4,703,306 | 10/1987 | Shor | 358/54 |
| 4,829,382 | 5/1989 | Hess et al. | 358/228 |
| 4,843,476 | 6/1989 | Fujioka et al. | 358/228 |

Primary Examiner—Joseph A. Orsino
Assistant Examiner—Jill Jackson
Attorney, Agent, or Firm—David M. Woods

[57] ABSTRACT

A system for automatically controlling the brightness of an optical image which is translated into digital signal samples corresponding to the pixels constituting the image includes a variable area aperture through which the image is transmitted for digitization into the samples, a device for varying the area of the aperture, a device for detecting peak values of the samples, and a device for operating the aperture area varying device until the percentage of the peak values which are above a certain peak value is a certain percentage.

8 Claims, 17 Drawing Sheets

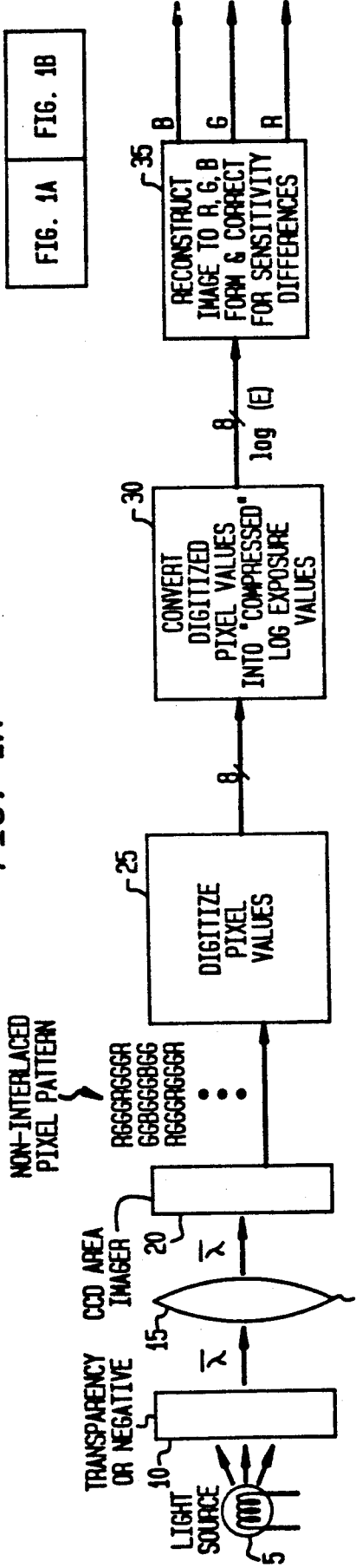

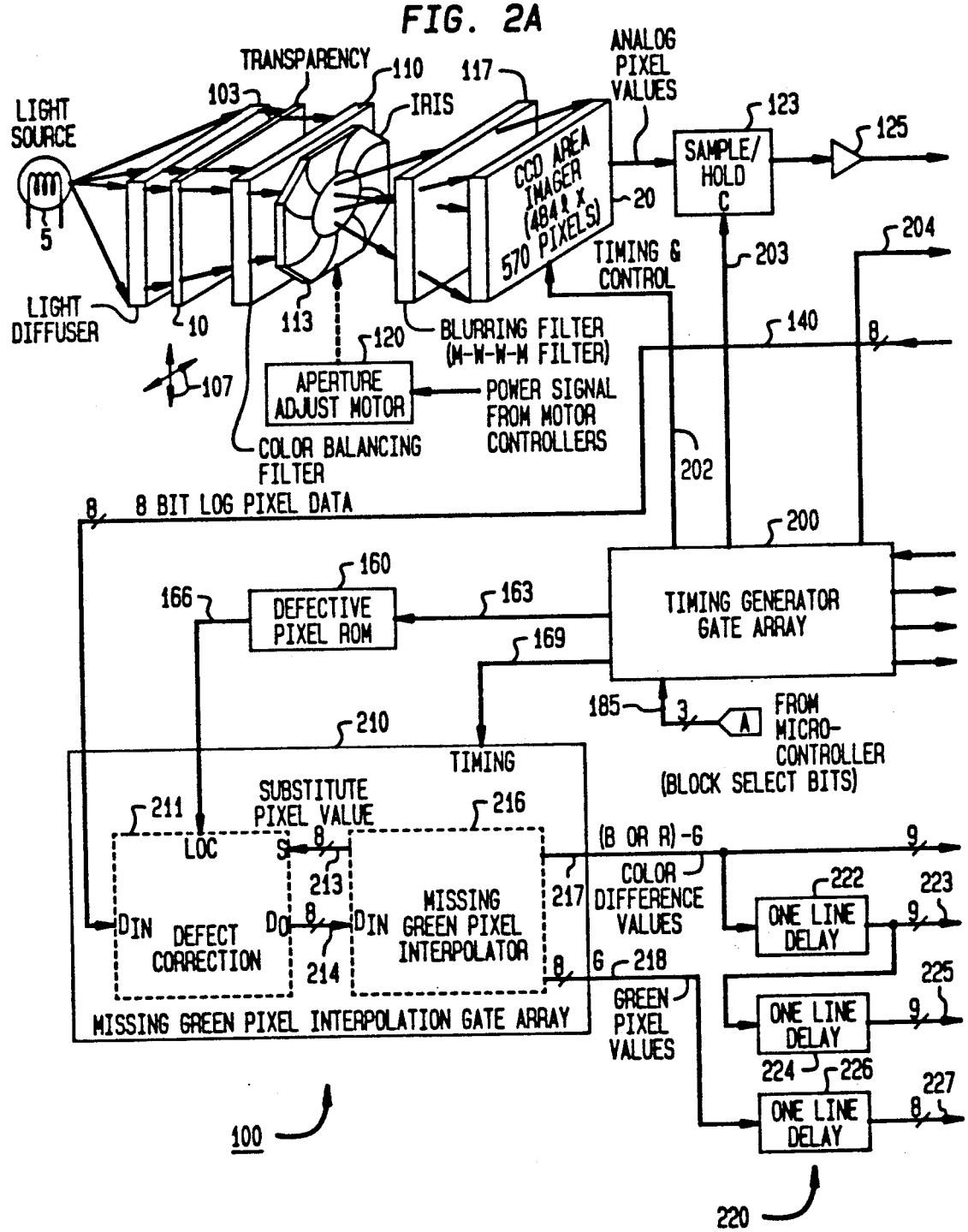

BLUE-GREEN COLOR DIFFERENCE PLANE — 505

| B-G | | | | B-G | | |
| | | | | | | |
| B-G | | | | B-G | | |
| | | | | | | |
| B-G | | | | B-G | | |

...

RED-GREEN COLOR DIFFERENCE PLANE — 510

| | | | | | | |
| | | R-G | | | R-G | |
| | | | | | | |
| | | R-G | | | R-G | |
| | | | | | | |

...

GREEN COLOR PLANE — 515

| MGP | G | G | G | MGP | G | G |
| G | G | MGP | G | G | G | MGP |
| MGP | G | G | G | MGP | G | G |
| G | G | MGP | G | G | G | MGP |
| MGP | G | G | G | MGP | G | G |

...

MGP = MISSING GREEN PIXEL

VI = VERTICALLY INTERPOLATED VALUE

VERTICAL INTERPOLATION

FIG. 5C

HORIZONTALLY INTERPOLATED BLUE-GREEN PLANE — 535

| 536 | 537 | 538 | 534 | 539 | | | |
|---|---|---|---|---|---|---|---|
| B-G | .75 (B-G) HI | .5 (B-G) HI | .25 (B-G) HI | B-G | .75 (B-G) HI | .5 (B-G) HI | |
| (B-G) VI | .75 | .5 | .25 | (B-G) VI | .75 | .5 | |
| B-G | .75 | .5 | .25 | B-G | .75 | .5 | ⋯ → |
| (B-G) VI | .75 | .5 | .25 | (B-G) VI | .75 | .5 | |
| B-G | .75 | .5 | .25 | B-G | .75 | .5 | |

⋮

HORIZONTALLY INTERPOLATED RED-GREEN PLANE — 540

| .5 (R-G) HI | .75 (R-G) HI | (R-G) VI | .25 (R-G) HI | .5 (R-G) HI | .75 (R-G) HI | (R-G) VI |
|---|---|---|---|---|---|---|
| .5 | .75 | R-G | .25 | .5 | .75 | R-G |
| .5 | .75 | (R-G) VI | .25 | .5 | .75 | (R-G) VI |
| .5 | .75 | R-G | .25 | .5 | .75 | R-G |
| .5 | .75 | (R-G) VI | .25 | .5 | .75 | (R-G) VI |

544 ⋮   543  546  542

HI = HORIZONTALLY INTERPOLATED VALUE

⎧ HORIZONTAL INTERPOLATION ⎫

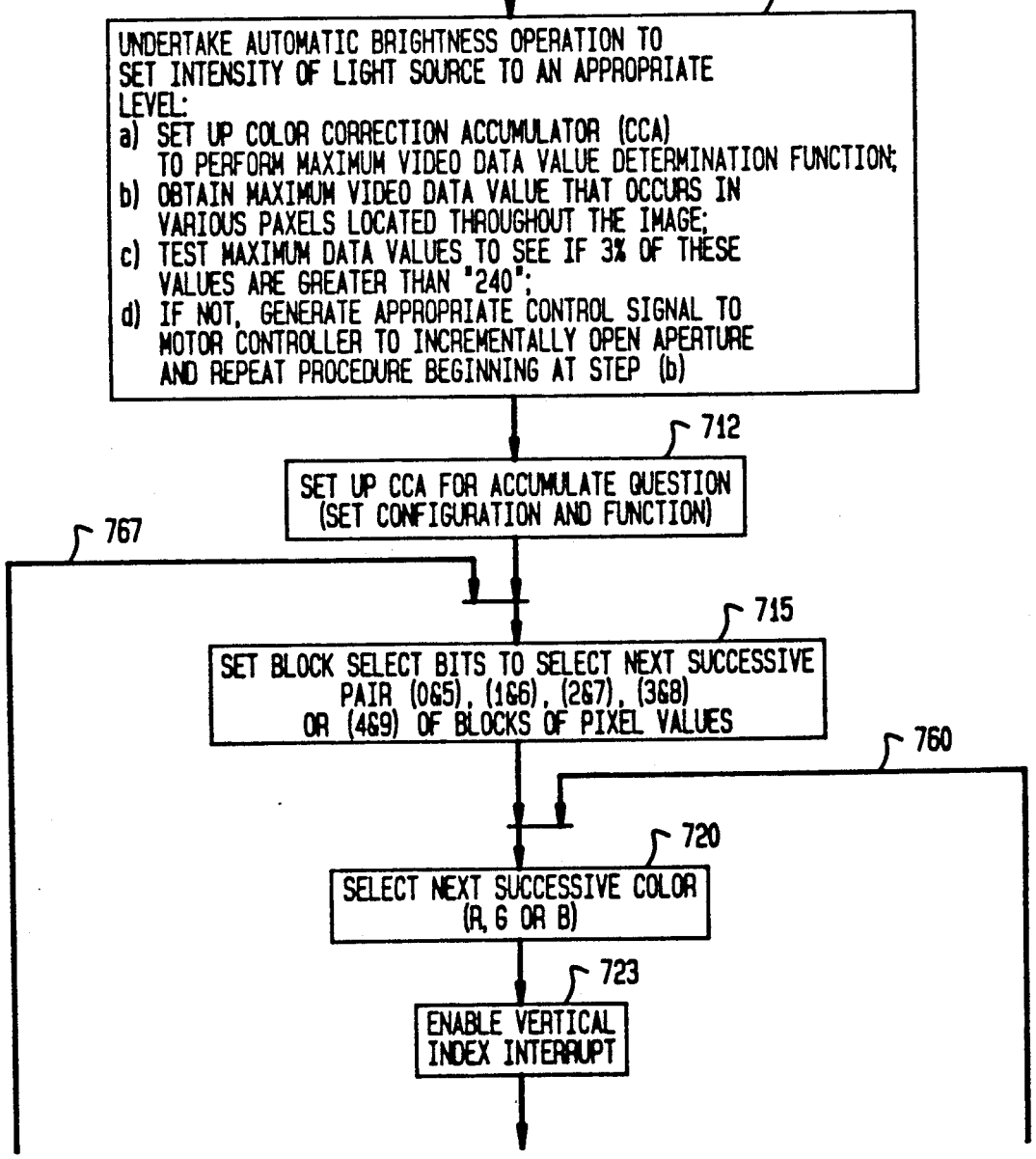

FIG. 8

AUTOMATIC COLOR BALANCING ROUTINE 800

ENTER

810 — CONVERT EACH DENSITY DOMAIN LOCAL AVERAGE VALUE $P_{dens}(\begin{smallmatrix}R\\G\\B\end{smallmatrix})i,j$ FROM R, G, B COLOR SPACE TO A DIFFERENT COLOR SPACE, i.e. NEUTRAL (NEU), GREEN-MAGENTA (GRM) AND ILLUMINANT (ILL):
$NEU(i,j) = f_1(R(i,j), G(i,j), B(i,j))$
$GRM(i,j) = f_2(R(i,j), G(i,j), B(i,j))$
$ILL(i,j) = f_3(R(i,j), B(i,j))$

820 — DETERMINE NEUTRAL TRANSFER DENSITY (TDNEU) AS A PRE-DEFINED FUNCTION, $f_4$, OF THE MAXIMUM, MINIMUM AND/OR AVERAGE VALUES OF THE NEUTRAL, RED AND BLUE LOCAL AVERAGE VALUES (FOR i = 0 TO 7 AND j = 1 TO 8)

830 — DETERMINE GREEN – MAGENTA TRANSFER DENSITY (GRMTD) AND ILLUMINANT TRANSFER DENSITY (ILLTD) AS WEIGHTED AVERAGES OF PRE-DEFINED FUNCTIONS OF ALL GREEN-MAGENTA AND ILLUMINANT LOCAL AVERAGES:
$GRMTD = \text{WEIGHTED AVERAGE} (f_5(GRM(i,j), ILL(i,j)))$
$ILLTD = \text{WEIGHTED AVERAGE} (f_6(GRM(i,j), ILL(i,j)))$
WHERE i = 0-7 AND j = 0-9

840 — DETERMINE RED, GREEN AND BLUE OFFSET VALUES $O_{dens}(\begin{smallmatrix}R\\G\\B\end{smallmatrix})$ IN PRINTING DENSITY DOMAIN AS PRE-DEFINED FUNCTIONS OF NEUTRAL, GREEN – MAGENTA AND ILLUMINANT TRANSFER DENSITIES:
$O_{dens}(R) = f_7 (NEUTD, GRMTD, ILLTD)$
$O_{dens}(G) = f_8 (NEUTD, GRMTD)$
$O_{dens}(B) = f_9 (NEUTD, GRMTD, ILLTD)$

RETURN

AUTOMATIC BRIGHTNESS ALGORITHM IN A SLIDE TO VIDEO TRANSFER UNIT

BACKGROUND OF THE INVENTION

1. Field of the Invention

This invention relates to apparatus and accompanying methods for use in a film to video transfer system for achieving automatic color balancing of color photographic images for subsequent display on a color monitor.

2. Description of the Prior Art

Traditionally, images have been stored and displayed in optical form. For example, photography is one commonly used method of capturing and subsequently displaying an image. Through photography, an image is captured through photo-chemical interactions occurring in a light sensitive medium, e.g. film, whenever that medium is exposed to light emanating from a desired scene, with the resulting image being depicted either as a developed photographic print or as a transparency, the latter forming a part of what is commonly referred to as a slide. With either prints or slides, the image is fixed by a pattern of color dyes dictated by the coloration of the captured image that has been captured on the film. Though photographic processes currently provide very high quality images, photography can be a somewhat tedious and problematic process, both in terms of properly exposing a piece of film and in terms of correctly developing that film to yield a proper optical depiction of the image. Moreover, a finite amount of time is required to transform an exposed piece of film, such as by processing it, into a visible image, such as a transparency, a color negative and/or a color print.

In addition, photographic images tend to be clumsy to display, particularly to relatively large groups such as those that might fill a classroom or an auditorium. In particular, available enlarging equipment limits the size of a color print. Moreover, greatly enlarged prints, due to their size, are frequently cumbersome to handle. Furthermore, greatly enlarged prints tend to be very expensive owing to the paper and enlarging equipment needed to produce the print. For those reasons, transparencies are often used in lieu of prints. Transparencies, in this case slides, are merely inserted in a desired order into a suitable carousel which, in turn, is placed into a slide projector. The projector successively projects light through each selected slide onto a suitable screen which is positioned some distance away from the projector. The distance between the screen and the projector dictates the size of the resulting displayed image. While slides, in many instances, provide a far more convenient way of displaying images than through prints, slides have various drawbacks that tend t limit their utility.

First, slides are also cumbersome to handle. Slides must be first be arranged into a desired order before they are inserted into a carousel. If for some reason the carousel is mishandled, e.g. dropped, and the slides separate from the carousel, the slides must again be placed into the proper order. This is time consuming. Furthermore, slides are relatively fragile. Inasmuch as light is projected through a transparency that forms part of the slide, the slide, though containing a protective frame peripherally situated around the transparency, must be carefully handled to prevent scratches or tears to the transparency which, in turn, would corrupt the resulting image. In addition, slides are usually shown in a darkened room which, as such, is generally not conducive to maintaining the attention of the viewers that are present there. In addition, the need for available projection equipment, including a suitably large screen, tends to limit the location at which slides can be shown.

In view of the drawbacks associated with photographically generated images, whether through prints or transparencies, the art is increasingly turning to video as a convenient way of capturing and subsequently displaying images. Owing to the proliferation of television and video display terminals as a communication media, viewers over the past several years are becoming increasingly accustomed to viewing a video image and generally prefer seeing a video image rather than an image projected from a slide. Moreover, since color monitors and video tape recorders are becoming rather ubiquitous, video images can be easily displayed at nearly any location. These cassettes are highly transportable, relatively inexpensive, can store an extraordinarily large number of different images, are much less susceptible to damage than slides and, owing to the ready transportability of a video cassette player and monitor, can be displayed nearly anywhere. Hence, for these reasons, video images that have been recorded on video cassettes are rapidly displacing slides by finding increasing use in educational, training, sales and many other environments and thereby becoming a preferred medium of choice.

Presently, a great body of visual information exists in photographic form, i.e. stored on developed film, either on slides, transparencies or other photographic formats. To display this information visually on a monitor, the information needs to be electronically converted into a suitable video form, such as an NTSC (National Television System Committee) composite video signal or separate red, green and blue (RGB) signals, for use with an available color monitor. While, at first blush, one would think that the conversion would simply involve electronically scanning a photographically produced image with a video camera and then storing the resulting video image. Unfortunately, this simplistic technique produces inadequate results.

Although photography provides an individual with an exceptionally wide latitude in capturing an image, oftentimes the actual image that is captured on film (negatives or slides) does not accurately depict an original scene. This can occur for any one of various reasons, such as illustratively because the exposure, lens aperture and/or shutter speed, is incorrect which results in an over- or under-exposure, the type of lighting, i.e. tungsten, fluorescent or sunlight, is not appropriate for the specific film being used, or the film is old and as a result has a reduced sensitivity. Generally, with a photographically recorded image, color balancing is used during a developing process in an effort to correct most deficiencies that reside in the image. Color balancing involves optically changing the coloration in an image, as originally captured on film, in a deliberate fashion.

The art has recognized that if a subsequent depiction of a photographic image on an output media is to be as faithful a reproduction of an original scene as possible, then not only must chromatic response differences that occur between an input media that captured the image and the output media be removed through color balancing but also deficiencies, to the extent they are correctable, that occur in the photographic image itself, must also be corrected as well. For example, teachings along these lines appear in U.S. Pat. No. 4,500,919 (issued to W. F. Schreiber on Feb. 19, 1985 and henceforth referred to herein as the '919 patent) in the context of use within a color editing system that generates appropriately engraved color separated printing cylinders for use a gravure printing press or the like to subsequently reproduce a color photographic image. Similar teachings appear in U.S. Pat. No. 4,364,084 (issued to T. Akimoto et al on Dec. 14, 1982 and henceforth referred to herein as the '084 patent) in conjunction with a system for transferring images on developed color film to photographic paper.

Therefore, a goal of any film to video transfer system must be end to end fidelity. Specifically, if the system is to produce a proper video depiction of a scene that has been photographically captured, then that scene must be reproduced as sharply and as perfectly as possible in video form even though the underlying photographic image itself may be somewhat defective. Hence, if the photographic image is defective, the deficiencies existing therein must be corrected prior to the image being stored in video form for subsequent display. For that reason, a film to video transfer system must employ color balancing.

Unfortunately, color balancing techniques generally known in the art often provide inadequate results. Specifically, in most instances, color balancing techniques known in the art for use in image transfer systems usually rely on some form of manual operator intervention in order to achieve a suitable color balance. In this regard, some known color balancing techniques, such as that disclosed in U.S. Pat. No. 4,583,186 (issued to R. C. Davis et al on Apr. 15, 1986) and U.S. Pat. No. 4,310,848 (issued to W. D. Carter et al on Jan. 12, 1982), rely on displaying a scanned photographed image and then requiring an operator to manually adjust the coloration of the displayed image prior to that image being printed. Other known color balancing techniques, such as those exemplified by the teachings in the '919 patent, the '084 patent and in U.S. Pat. No. 4,676,628 (issued to Asbury on June 30, 1987) and U.S. Pat. No. 3,972,066 (issued to Seki et al on July 27, 1976) attempt to first color balance a scanned photographic image in a predetermined fashion and display a resulting color balanced image on a color monitor to an operator who is then free to manually change the coloration of any portion of the image, if necessary and as desired, to produce a proper depiction of an original scene. Unfortunately, in any of these prior art techniques, time is consumed whenever an operator intervenes to adjust the color or even to just inspect the image. This, in turn, disadvantageously decreases the throughput of the image transfer system that uses such a color balancing technique. Since the time available for operator intervention is often quite limited, color balance techniques known in the art have not always yielded satisfactory results.

Hence, while recognizing the need to employ some form of color balancing, the art has thusfar failed to provide a technique for use in an image transfer system, and particularly in a film to video transfer system, that automatically and properly color balances an image while generally eliminating or, at the very least, substantially reducing the need for operator intervention.

Therefore, a need currently exists in the art for apparatus and accompanying methods for use therein that, to the extent possible, automatically balances colors in a film to video transfer system in order to provide a faithful reproduction of an original scene. Not only should this apparatus automatically balance the colors based upon differences in chromatic response between film and video but also this apparatus should be able to substantially correct for deficiencies that occur in a photographed image itself.

SUMMARY OF THE INVENTION

Accordingly, an object of the present invention is to provide apparatus and accompanying methods for use in a film to video transfer system that, to the extent possible, automatically and properly balances the colors in an image being transferred from film to video or generally from any photographic medium (such as illustratively slides, negatives or prints) to any electronic medium or display (such as illustratively a magnetic memory, a optical memory, a video display, an electronic printer, an electronic signal and/or others).

A specific object is to provide such apparatus and methods that not only compensate for differences in chromatic response occurring between film and video but also corrects for deficiencies that occur in a photographed image itself.

A further specific object is to provide such apparatus and methods that substantially reduces, if not totally eliminates, the need for operator intervention to achieve a properly balanced video reproduction of an original scene.

In an exemplary embodiment, these and other objects are accomplished in accordance with the teachings of the present invention by a system for transferring a scanned image from film to video format which: first, through local averaging, transforms the scanned image from logarithmic exposure ("log exposure") RGB color values into corresponding printing density values, then utilizes a printing density based color correction method to generate a color correction offset value for each of three primary colors (e.g. red, blue and green—RGB), and finally converts the three resulting RGB color correction offset values from the printing density domain back to the log exposure domain wherein each offset value is subsequently used to correct the corresponding RGB color values associated with each of the pixels that collectively forms a subsequent scan of the same image prior to the conversion of each of the color balanced RGB pixel values into analog video form.

In accordance with the invention claimed herein, the system for transferring a scanned image from film to video format automatically controls the brightness of the optical image which is translated into digital samples. The system includes a variable area aperture through which the image is transmitted for digitization into the samples, a device for varying the area of the aperture, a device for detecting peak values of the samples and a device for operating the aperture area varying device until the percentage of peak values which are above a certain threshold value is a predetermined percentage.

In accordance with a preferred embodiment of my invention, local averages are determined for each vertically contiguous 30 line group of 56 horizontally contiguous pixels, each such group henceforth referred to as a "paxel". Specifically, a scanned image, such as one having 560 pixels by 240 lines wherein each pixel has associated digital log exposure RGB color values, is partitioned into paxels, such as a matrix of 8-by-10 paxels. Each paxel has one set of log exposure color (RGB)

values, wherein each value equals the local average of the log exposure intensity values of a corresponding primary color of all the individual pixels that constitute that paxel. Each local average RGB color value is then suitably converted from the log exposure to printing density domains. A printing density color correction method, heretofore only suitable for use in film to print transfers, is then used to determine RGB color correction offset values given the printing density RGB local average values. The resulting RGB printing density offset correction values are then converted back into the log exposure domain. Each log exposure offset correction value is then added to a corresponding digital color value associated with each pixel that forms a subsequent scan of the image to provide digital color balanced RGB pixel values. The resulting color balanced RGB pixel values are then converted into the analog video domain, as analog RGB video signals and/or as a composite NTSC color signal.

In accordance with a feature of my invention, substantially any printing density based color correction method can be used in lieu of developing a specific color correction method applicable to a film to video transfer process. Not only does use of such a printing density based correction method provide highly acceptable color balancing in a film to video transfer system, use of such methods advantageously saves significant development time and expense that would otherwise be incurred during the implementation of such a transfer system.

In other embodiments, the exposure values need not necessarily be in logarithmic form. Furthermore, the conversion or transformation need not necessarily be to a printing density domain, but instead could be to some other domain in which the specific automatic color correction method that will be used operates. The resulting color corrected exposure values may be applied to any electronic medium or display, such as a liquid crystal light valve video projector, a still video memory (magnetic or optical), a still video transceiver, an electronic printer (thermal or electro-photographic) or, of course, a video monitor.

BRIEF DESCRIPTION OF THE DRAWINGS

The teachings of the present invention may be readily understood by considering the following detailed description in conjunction with the accompanying drawings, in which:

FIG. 1 shows the correct alignment of the drawing sheets for FIGS. 1A and 1B;

FIGS. 1A and 1B diagrammatically show, at a high level, the inventive method of automatically balancing colors in a film to video transfer system;

FIG. 2 shows the correct alignment of the drawing sheets for FIGS. 2A-2D;

FIGS. 2A-2D collectively depict a block diagram of film to video transfer system 100 that embodies the teachings of the present invention;

FIG. 5 shows the correct alignment of the drawing sheets for FIGS. 5A-5D;

FIGS. 5A-5D diagrammatically show the missing green pixel interpolation, blue-green and red-green color difference determination, vertical interpolation, horizontal interpolation and re-combination operations undertaken by missing pixel interpolator function 210, vertical color difference interpolator function 232 and horizontal chroma interpolator and re-combination function 237 that are provided by missing pixel interpolator gate array 210 and chroma interpolator gate array 230 both shown in FIGS. 2A-2D;

FIG. 7 correct alignment of the drawing sheets for FIGS. 7A-7C;

FIGS. 7A-7C collectively depict a flowchart of Main Program 700 that is executed by micro-controller system 180 shown in FIGS. 2A-2D;

FIGS. 8 depicts a flowchart of Automatic Color Balancing Routine 800 that is executed as part of Main Program 700 shown in FIGS. 7A-7E.

To facilitate understanding, identical reference numerals have been used, where possible, to denote identical elements that are common to the figures.

DETAILED DESCRIPTION

Figure 1B:
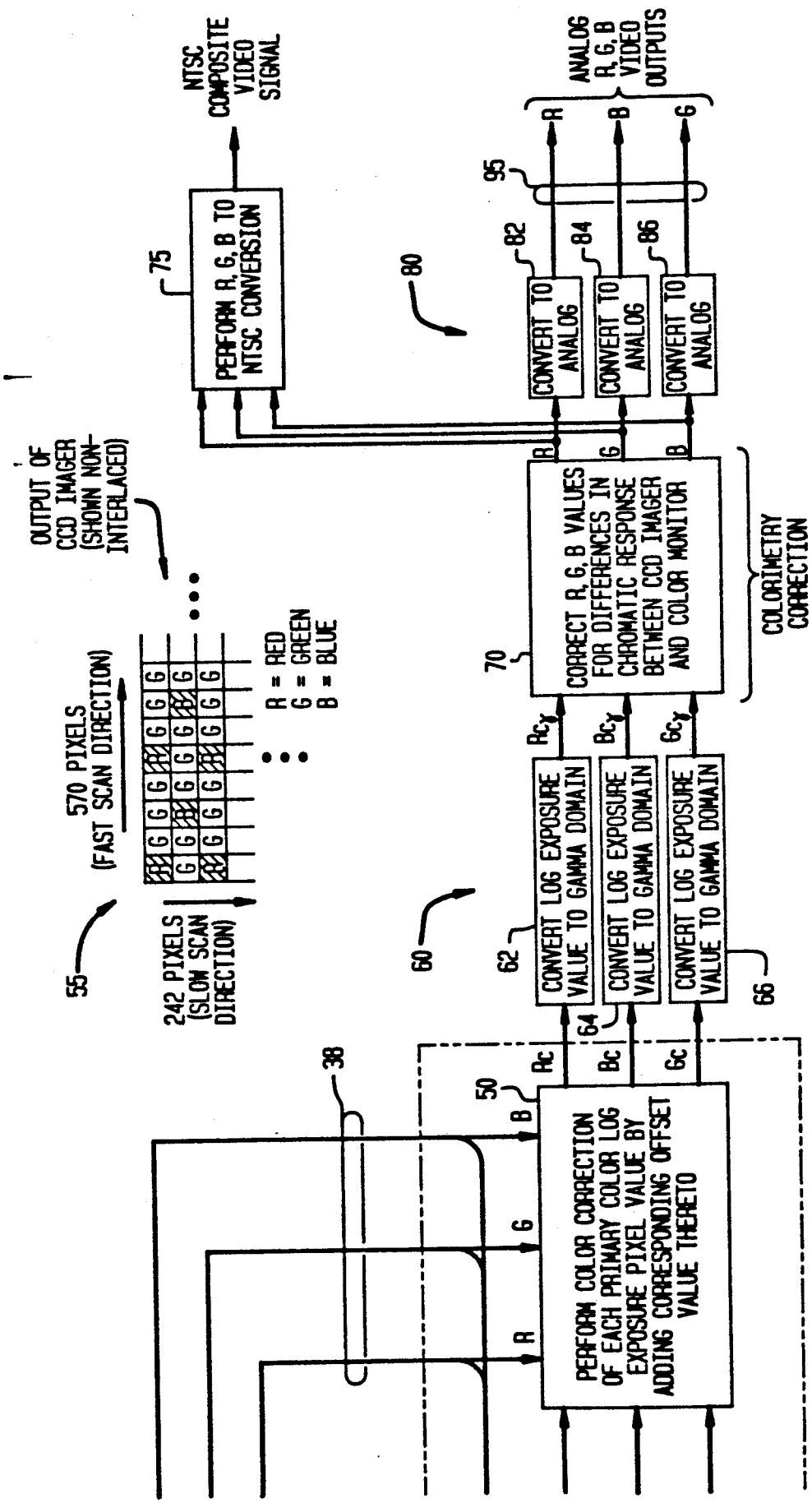
Figure 2B:
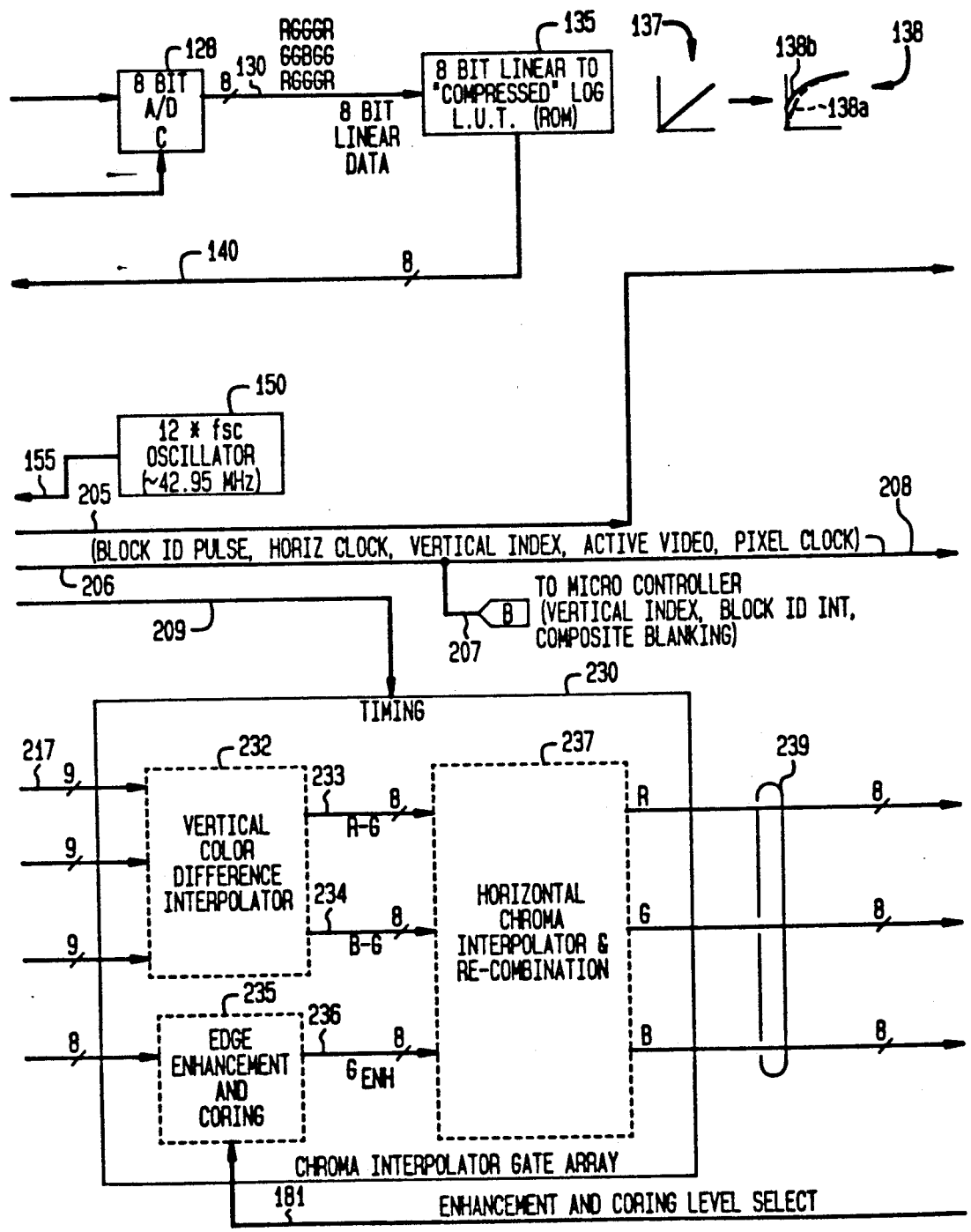
Figure 2C:
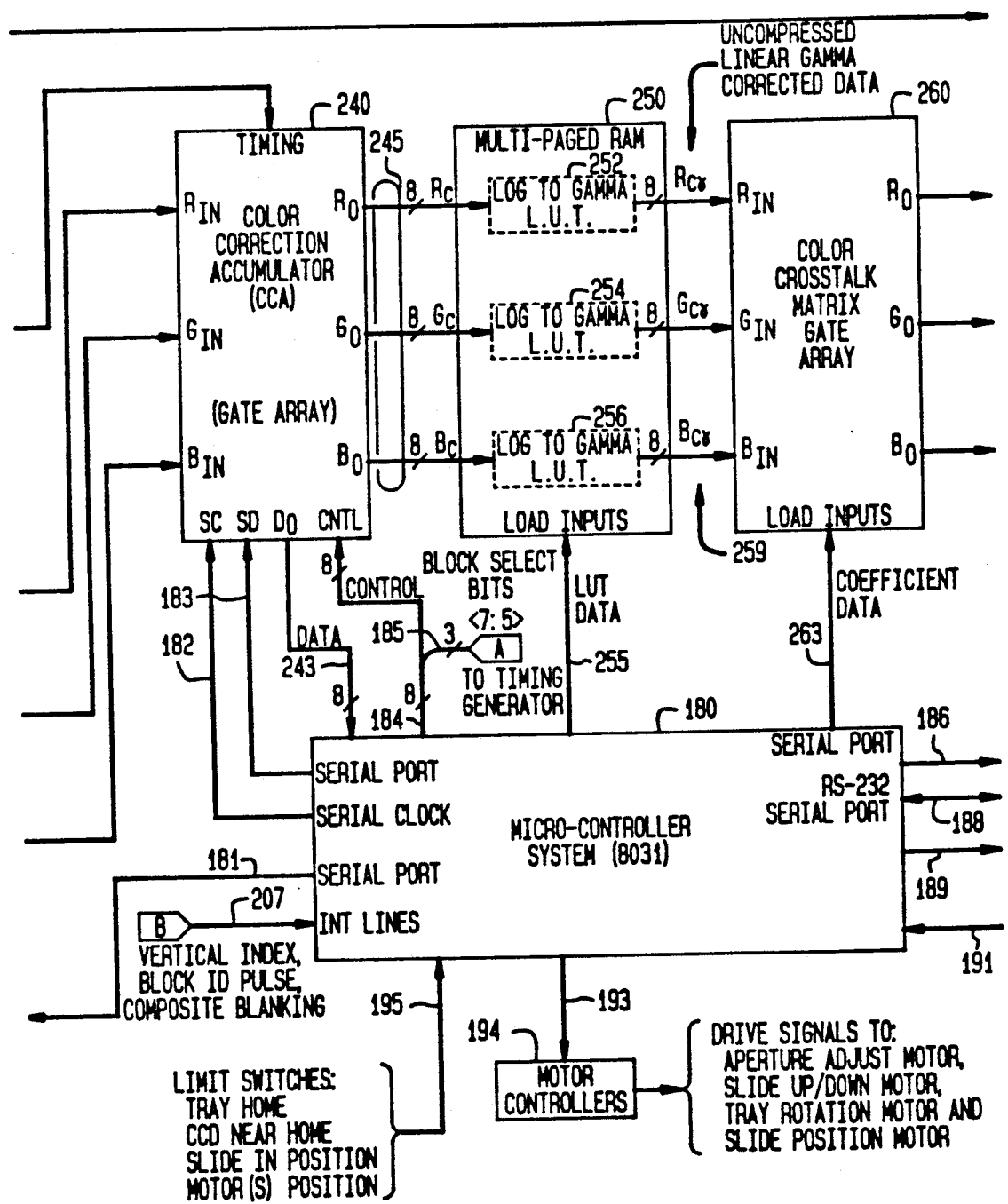
Figure 2D:
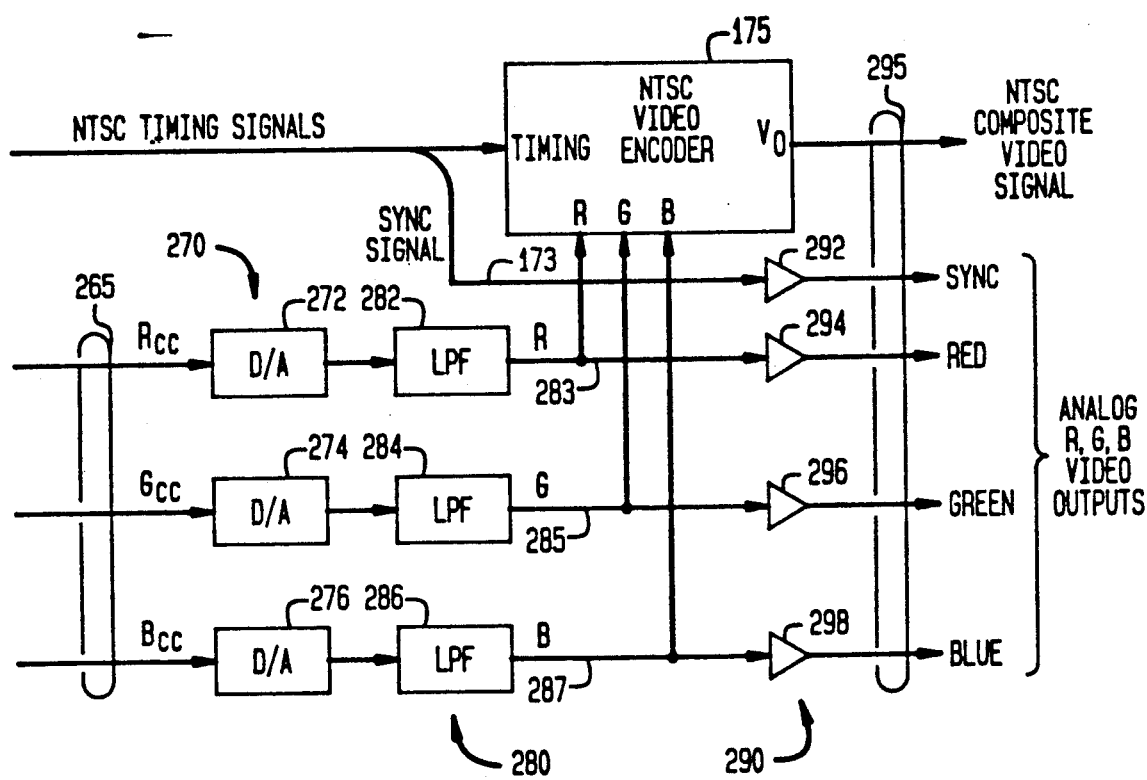
Figure 2D:
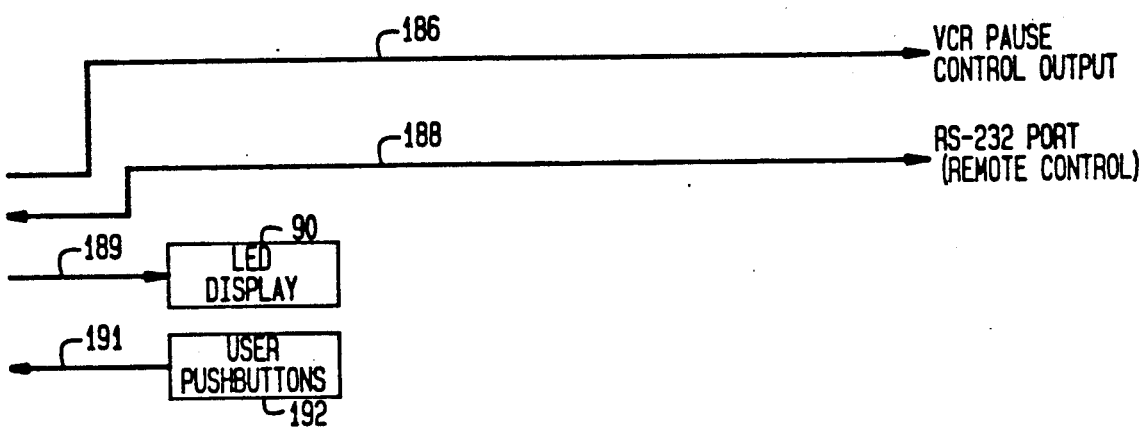

After reading the following detailed description, those skilled in the art will clearly recognize that the teachings of the present invention are applicable to any system in which an image is transferred from an input media (i.e. one display format), such as film, to an output media, such as but not limited to a color video display where the coloration of the image recorded on the input media is not properly balanced and/or difference(s) occur in the chromatic response of the input and output media. Nonetheless, to simplify the following discussion, the invention will be discussed in the context of use in a system for transferring color images from film as one display format, e.g. color transparencies and/or color negatives, to video form, as another display format, for subsequent display on a color video monitor.

Color balancing techniques known in the art for use in image transfer systems have often provided inadequate results particularly when used in the video domain. Specifically, these techniques often relied on first displaying a color image that is to be reproduced, such as from a photographic negative or transparency, then possibly performing some type of initial pre-determined color balance on that image and finally requiring an operator to manually adjust the coloration of the displayed image in order to achieve a proper color balance in the depicted image prior to that image being transferred to another medium, such as for example being printed on photographic paper. Anytime an operator intervenes to change the color balance or even inspect the depicted image prior to the occurrence of an image transfer, time is expended. Such an expenditure of time disadvantageously reduces the throughput of the image transfer system. Moreover, an operator often achieves a balanced image through a trial and error approach.

Unfortunately, an operator does not always have sufficient time to achieve a proper color balance in all images being transferred. As such, manual based color balancing techniques have not always yielded satisfactory results. This is particularly true in film to video transfer systems where, of necessity, owing to the large number of separate images being transferred, system throughput is a major consideration.

Now, in accordance with the teachings of my invention, I have discovered that automatic color balancing, which requires minimal, if any, operator intervention, can be achieved in a film to video transfer system by first transforming a scanned image that is to be transferred from logarithmic exposure ("log exposure") RGB color values into corresponding printing density values through local averaging, then utilizing a printing density based color correction method to generate a color correction offset value for each of three primary colors (e.g. red, blue and green—RGB), and finally converting the three resulting RGB color correction offset values from the printing density domain back to the log exposure domain wherein each offset value is subsequently used to correct the corresponding red, green and blue color values associated with each of the pixels that collectively forms a subsequent scan of the same image prior to the conversion of each of the color balanced RGB pixel values into analog video form.

A. Automatic Color Balancing Process in a Film to Video Transfer System

A high level diagram of my inventive method of automatically balancing colors of a scanned color image that occurs in a film to video transfer system is depicted in FIGS. 1A and 1B, for which the correct alignment of the drawing sheets for these figures is shown in FIG. 1. An overview of this method will first be discussed, followed by a detailed discussion.

To appropriately color balance an image stored on film (a "film image"), either a color transparency (commonly referred to as a "slide") or as a color negative, and then transfer the resulting image from the film to video, separate scans are made of the film image. A number of separate scans are made of the film image, using illustratively a charge coupled device (CCD) area scanner, in order to generate appropriate color correction offset values with a subsequent scan made to perform the actual color balancing and image transfer from film to video. In particular, fifteen separate substantially identical scans of the image are made, with each scan including appropriate blanking intervals lasting approximately 15 milliseconds (for a total of approximately 0.25 seconds for all fifteen scans), to automatically generate appropriate color correction offset values for use in color balancing the image. A separate offset value is generated for each of there primary colors: red, green and blue. Once these three offset values are generated, each value is added to the color value for each pixel in a corresponding R, G or B color plane in the image. The resulting color balanced log exposure RGB pixel values are then converted from the log exposure domain into the gamma domain. Resulting red, green and blue gamma domain pixel values are then corrected (so-called "colorimetry" corrections) for differences that occur between the chromatic response of the film and that of a color video monitor. Thereafter, the resulting colorimetry corrected RGB pixel values are simultaneously applied to an NTSC converter, along with suitable well-known video synchronization and timing signals (not shown in FIGS. 1A and 1B), in order to provide a composite three color analog video signal. In addition, a separate RGB video output signal is also provided by separately and simultaneously converting every corresponding pixel in all three colorimetry corrected color planes to the analog domain and providing the three resulting analog values as separate respective analog RGB output signals. The video signals can be routed to a video cassette recorder for subsequent recording, to a color monitor for display purposes or to other well-known video processing equipment situated downstream of the film to video transfer system.

Each pixel produced by the CCD scanner is first converted from analog to digital form with each resulting digital value subsequently being converted from a linear domain into a compressed log exposure domain. Inasmuch as the CCD scanner produces a single color (either red, green or blue) per scanned pixel, each single color log exposure domain pixel is then converted, through suitable processing as discussed in detail below, into a three color pixel that has separate log exposure values for the red, green and blue color content that occurs at that pixel location in the image. Sensitivity corrections are also made to the scanned image pixels in order to compensate for defective pixel values.

A four step process is used to produce the three color correction offset values from the results of the fifteen separate substantially identical scans of the image. First, for the pixels in each color plane of a scanned image, a separate local average value of the pixels situated within every pre-defined group of pixels ("paxels") in that scan are calculated in the log exposure domain. Second, each resulting local average value is then transformed into the printing density domain. Printing density, which is commonly used in the photographic process of making printed images from film, is defined as the optical density of a negative that has been measured using a given light source and as seen by a given set of photographic paper spectral sensitivities. Third, the color correction offset values, in the printing domain, are then determined, using a color balancing technique set forth in detail below, from the resulting local average values in the RGB color planes that form the image. Lastly, the resulting offset values are then transformed back into the log exposure domain and are subsequently used in varying the coloration of each pixel that forms the image. While a specific color balancing technique is described hereinbelow in detail, transforming between the log exposure and printing density domains permits substantially any color balancing technique that heretofore, based upon teachings in the art, was only used in film to print transfer systems to now be advantageously used in a film to video transfer system.

Specifically, as shown in FIGS. 1A and 1B, transparency 10, containing a stored photographic image, is placed within a light path extending from projection lamp 5, through optical system 15 to CCD area imager 20. As such, the stored image will be projected through the optical system and onto the CCD area imager. The CCD imager produces an line-by-line scan, 484 lines in a slow scan (vertical direction) by 570 pixels in a fast scan (horizontal), of the image in which each sensor in the CCD responds to only one primary color in a corresponding pixel location in the image. In actuality, the imager interleaves two scans of the image ("image fields"). However, to simplify the following discussion, the output of the CCD imager will hereinafter be viewed as producing one non-interleaved image field of 242 lines by 570 pixels. The resulting scanned image will resemble image portion 55 in which, in any scan line, a red or blue pixel value (here shown shaded merely for illustrative purposes) is followed by three green pixel values. Specifically, the output of the imager, which is in analog form, for successive scan lines alternates between, for example, "RGGGRGGGR . . . " and "GGBGGGBGG . . . " (where R represents a pixel value for the color red, G represents a pixel value for the color green and B represents a pixel value for the color blue). The output of CCD imager 20 is then appropriately converted into log exposure form. First, the analog output of the imager is digitized into eight-bit values, as represented by block 25. Thereafter, as shown by block 30, the digitized pixel values are themselves converted into compressed log exposure form. Once this occurs, the log exposure pixels values are then used, within block 35, to re-construct an RGB image wherein each pixel in the re-constructed image has three corresponding primary color values (one in each of the R, G and B color planes) associated therewith.

The resulting RGB pixel values are applied over path 38 to color correction process 40. Within this process, the RGB pixel values are applied to both blocks 42 and 50. Blocks 42-48, which are predominantly implemented in software as described in detail below, use the RGB log exposure values for each pixel in the re-constructed image that occur during fifteen separate substantially identical scans to determine the red, green and blue color correction offset values, i.e. $O_{LOG}(R)$, $O_{LOG}(G)$ and $O_{LOG}(B)$. Block 50 then uses these three offset values to appropriately correct the RGB color values for each pixel in a subsequent substantially identical scan of the film image for color and lightness in-balances. For simplicity, both color balancing and lightness correction will hereinafter be collectively referred to as color balancing.

In particular, during each of the fifteen substantially identical scans of the image, block 42 fabricates an 8-by-10 array of local average log exposure values for a particular primary color plane. Each local average value is associated with a particular paxel in one of these image scans. A paxel, as discussed below particularly in conjunction with FIG. 6C, is an image block containing 30 contiguous vertical lines of 56 contiguous horizontally oriented pixels. Each image scan contains 80 such local average values in each color plane for a total of 240 separate local average values for all three color planes. To provide a simple notation, corresponding log exposure RGB local averages for the same paxel will be represented as a three color local average, which in vector notation is $P_{LOG}(R,G,B)_{i,j}$ where i runs from 0 to 7 and j runs from 0 to 9. Once all these three color local averages have been determined, block 44 converts, as set forth in detail below, each three color local average value into a three color local average in the printing density domain, i.e. $P_{dens}(R,G,B)_{i,j}$. Thereafter, block 46, in a specific manner discussed in detail below, utilizes the three color local averages values in the density domain to calculate the red, green and blue offset correction factors, i.e. $O_{dens}(R,G,B)$. Block 48 then converts the offset correction factors into the log exposure domain. The resulting red, green and blue log exposure offset correction values, i.e. $O_{LOG}(R)$, $O_{LOG}(G)$ and $O_{LOG}(B)$, are then applied to block 50.

During the following scan of transparency 10, block 50 additively combines the three offset correction values with each pixel in the corresponding RGB color planes in the scanned image. The resulting corrected pixel values, $R_C$, $B_C$ and $G_C$, are then converted into the gamma domain by block 60 and specifically block 62, 64 and 66, respectively. In particular, the image in video form will eventually be displayed on a video monitor. Such a monitor is a non-linear device in that uniform digital steps in color intensity do not produce uniform changes in displayed color intensity (brightness). Therefore, the digital value for each corrected color must be transformed through a process (implemented here through look up tables) commonly known as gamma correction so that an equal digital steps in color intensity will produce equal steps in displayed brightness. As a result, the tonescale of the incoming digital image will match that of the displayed image. Gamma correction also involves, when necessary, inverting the corrected color signals and correcting for the tonescale of a film negative whenever the CCD imager is scanning a negative so that the resulting displayed image is a representation of a desired scene, rather than that stored on the negative itself. The resulting gamma corrected RGB pixel values, $RC_\gamma$, $BC_\gamma$ and $GC_\gamma$, are applied to block 70 for colorimetry corrections. Specifically, the colorimetry corrections correct for differences in chromatic response occurring between film and the phosphors used to display a color image on the video monitor being used. Colorimetry correction is usually necessary inasmuch as the color monitor in use with the film to video transfer system may display an image using different primary colors or at least different hues of the same primary colors than that which the CCD sensor is measuring. This correction is performed by multiplying the gamma corrected RGB color values for all pixels by a 3-by-3 matrix with pre-settable coefficient values, as described in detail below.

The resulting colorimetry corrected digital red, green and blue color values produced by colorimetry correction block 70 are converted into analog RGB signals by blocks 80 and specifically by respective blocks 82, 84 and 86. The resulting analog video signals are then applied, via path 95, as the analog RGB video signals, along with a synchronization signal shown in FIGS. 2A-2D, for connection to an external color monitor or other video equipment that utilizes an analog RGB video input. In addition, the colorimetry corrected RGB digital values are also applied to block 75 which converts these values, along with suitable timing and synchronization signals not shown in FIGS. 1A and 1B, into a composite NTSC video signal for connection to external video equipment that requires such a composite signal.

B. Film to Video Transfer System 100

With the above explanation in mind, the discussion will now turn to a detailed description of the hardware used to implement film to video transfer system 100 followed by a detailed discussion of the software that executes therein to provide the three color correction offset values that are used in automatic color balancing.

1. Hardware Considerations

Figure 5B:
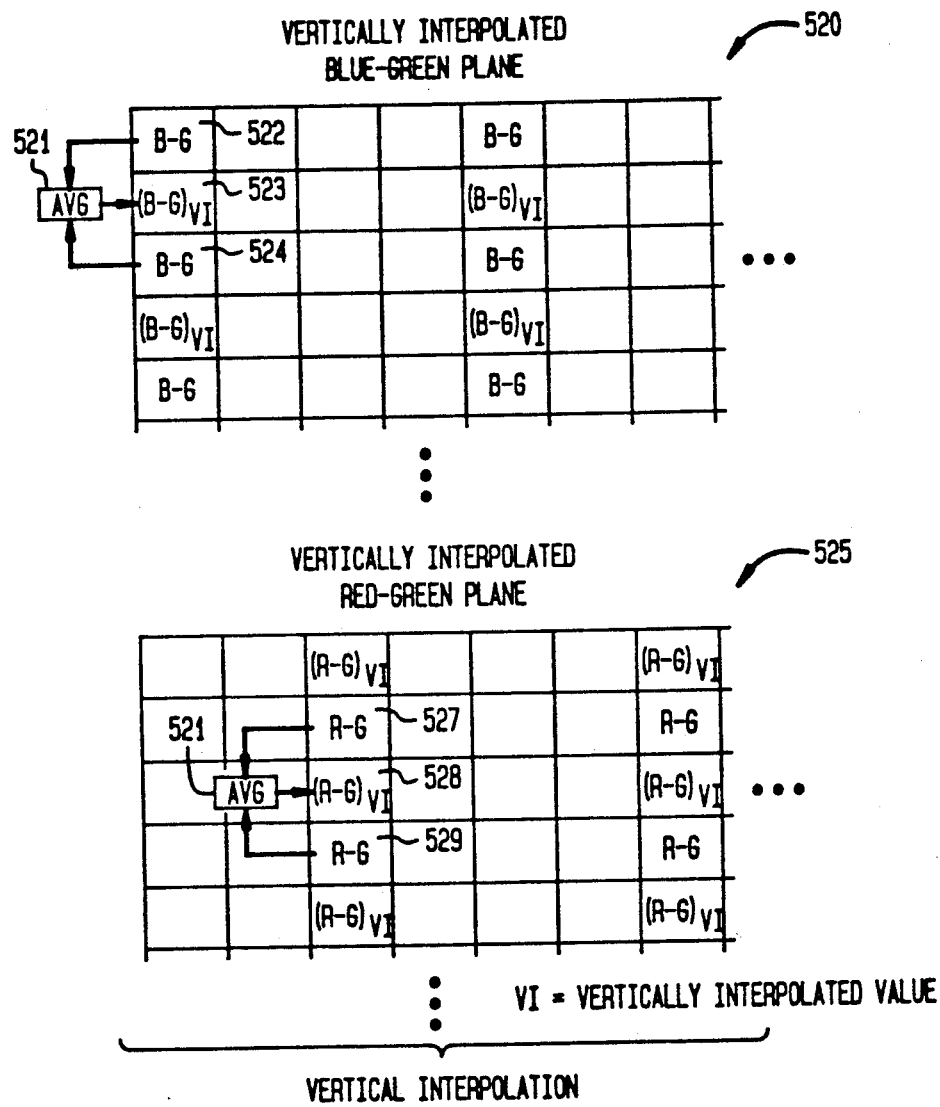
Figure 5B:
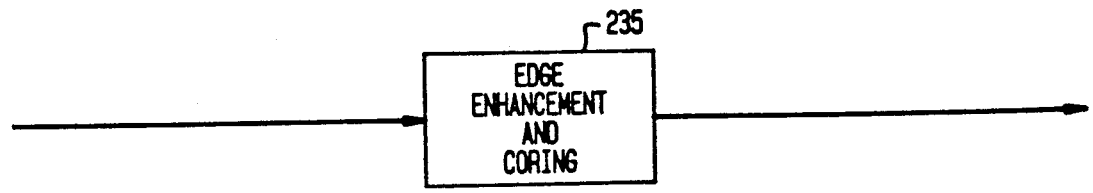
Figure 5D:
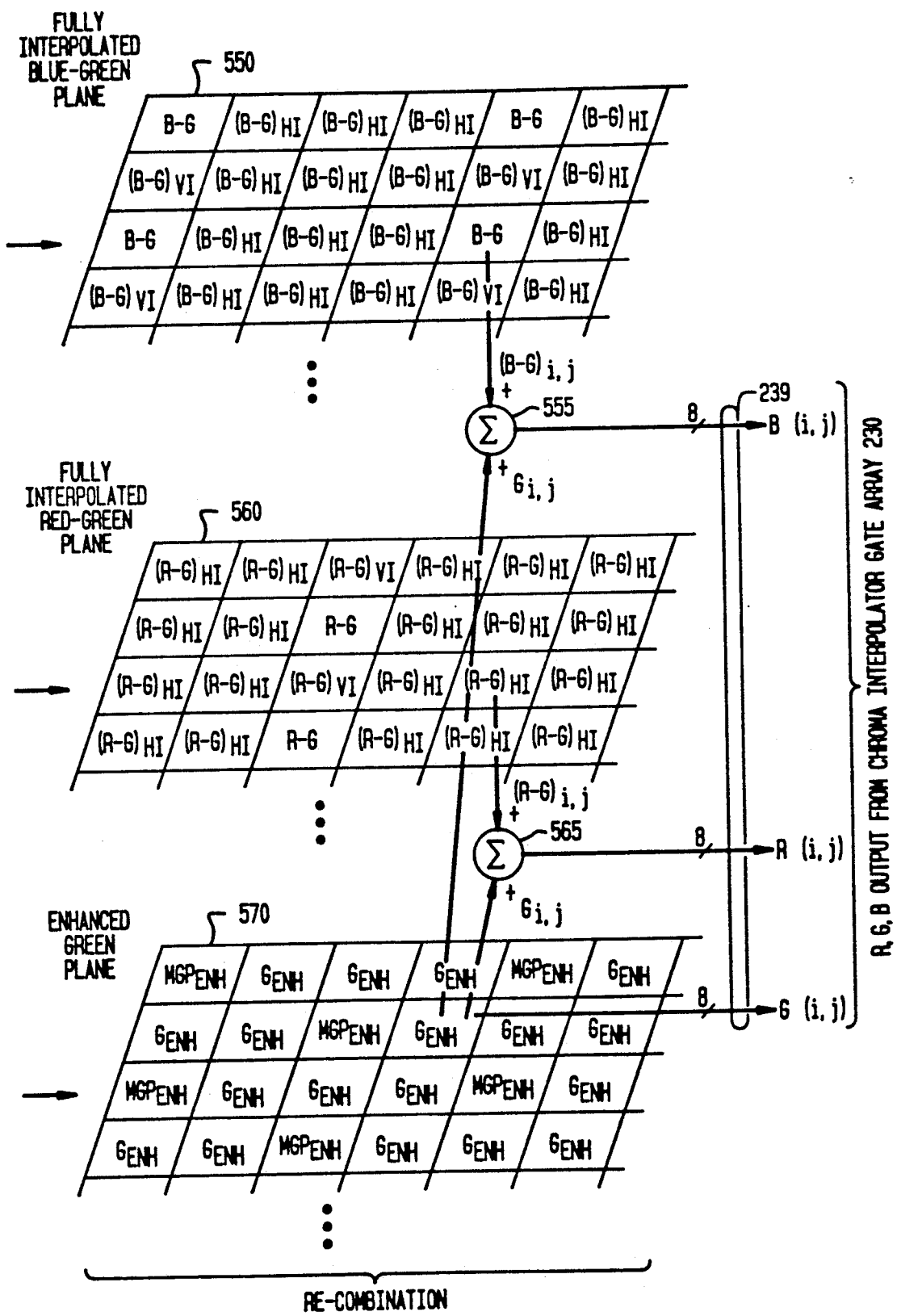

A block diagram of film to video transfer system 100 that embodies the teachings of the present invention is depicted in FIGS. 2A-2D, for which the correct alignment of the drawing sheets for these figures is shown in FIG. 2. To fully understand the functioning of the hardware, particularly the manner in which a three color RGB image is re-constructed from single color pixels, the reader should throughout the following discussion also simultaneously refer to FIGS. 5A-5D, for which the correct alignment of the drawing sheets is shown in FIG. 5. In this regard, FIGS. 5A-5D diagrammatically show the missing green pixel interpolation, blue-green and red-green color difference determination, vertical interpolation, horizontal interpolation and re-combination operations undertaken by missing pixel interpolator function 210, vertical color difference interpolator function 232 and horizontal chroma interpolator and recombination function 237 that are provided by missing pixel interpolator gate array 210 and chroma interpolator gate array 230 both shown in FIGS. 2A-2D.

Specifically, as shown in FIGS. 2A-2D, system 100 incorporates a light path for scanning a color image stored, for example, on a transparency. This light path includes light source 5, typically a suitable tungsten-halogen lamp, which generates light that subsequently travels through light diffuser 103, transparency 10, color balancing filter 110, adjustable iris 113, blurring filter 117 and finally impinges upon CCD area imager 20. In particular, light diffuser 103, which is typically a ground glass light diffuser, diffuses the intense light produced by the light source to provide substantially uniform illumination in two-dimensions across the transparency. The resulting light that passes through transparency 10 strikes color balancing filter 110 which, typically fabricated from blue tinted glass, attenuates the red and green components of the image in order to compensate for the spectral response of the CCD area imager. If this filter were eliminated, then for white light, the red and green channels provided by imager would very likely saturate before any useful data were generated in the blue channel. As such, by attenuating the red and green components of the image using the color balance filter prior to the image impinging upon the imager, the CCD imager will then produce a more balanced chromatic output than would otherwise occur. Adjustable iris 113, which is positioned behind the transparency, through the size of its aperture regulates the amount of light which passes through the transparency and strikes the imager. The aperture size is controlled by aperture adjust motor 120 in response to a suitable power signal from motor controllers 194, which will be discussed in detail below. At this point, suffice it to say, the controllers are provided with appropriate signals, to open or close the aperture by a pre-determined incremental amount, from micro-controller 180 located within system 100. Light emanating from iris 113 strikes blurring filter 117 after which this light then impinges directly onto CCD imager 20. As discussed above, CCD imager 20 produces an analog output signal in which each pixel in this signal provides a value of one of the three primary colors that occur at a separate corresponding pixel in the image, with specifically a red or blue pixel value followed by three successive green pixel values, as illustratively depicted on a non-interleaved basis as image portion 55 shown in FIGS. 1A and 1B. Hence, the output of the imager can thus be said to be a stream of single color pixels. The particular imager used is a 484 line by 570 pixel E-3 Imager with a 3-Green Color Filter Array as manufactured by the Eastman Kodak Company located in Rochester, New York. Blurring filter 117 is a magenta-white-white-magenta filter that blurs red and blue information in the image more than it does green information in order to limit the spectral bandwidth of the scanned light and by doing so substantially reduce aliasing that might otherwise appear in the output of the CCD imager. The imager, operating at a clock rate of 10.7 MHz, is controlled by various well-known timing and control signals provided by timing generator gate array 200 and applied to the imager via leads 202. The reader is referred to U.S. Pat. No. 4,663,661 (issued to J. A. Weldy et al on May 5, 1987) for a detailed discussion of the operation of the CCD imager and blurring filter 117. Through signals produced by timing generator and gate array 200, a frame of the scanned image, on a non-interleaved basis, is limited to a central region of 560 pixels by 240 lines. As such, the peripheral pixels in the image, though scanned, are not utilized. Timing generator gate array 200 fabricates suitable timing and control signals to control the sequencing of operations undertaken by system 100. In particular, whenever a pixel is being produced by the CCD imager that lies within the central region, timing generator gate array 200 produces a high level on an ACTIVE VIDEO signal which appears on leads 208. This signal is subsequently used, as discussed below, to define those pixels that occur in any run of 56 horizontally contiguous pixels that are used to define a paxel. Oscillator 150 provides clock pulses that occur at a fixed frequency of twelve times the well-known NTSC color subcarrier frequency, i.e. 12 * 3.5895 MHz or approximately 42.95 MHz, via lead 155, to gate array 200.

The resulting linear analog pixel values produced by the CCD imager are now digitized and then converted into the compressed log exposure domain. Specifically, under control of suitable timing and control signals generated by timing generator gate array 200 and appearing on leads 203, sample and hold 123 repetitively samples the analog output of the imager and then holds the resulting sampled value for a fixed pre-determined period of time. The resulting single color analog sample is then amplified by amplifier 125 and provided to an analog data input of analog-to-digital (A/D) converter 128. This converter, under control of suitable timing and control signals appearing on leads 204 and generated by timing generator gate array 200, converts each analog sample into an equivalent 8-bit digital value. Each of these linear digital values, appearing in parallel fashion on leads 130, is then applied to a data input of look-up table 135. This table, implemented in read only memory (ROM), contains pre-defined compressed logarithmic function 138$b$ in eight-bit resolution. For linear input function 137, resulting compressed logarithmic function 138$b$, shown in graphical form, approximates an ideal logarithmic function for relatively high level input values and deviates through a non-zero offset value from ideal logarithmic function 138$a$, shown in dotted lines, for relatively low level input values so as to provide a degree of data compression. This compression advantageously provides a noticeable degree of noise suppression at low light levels at the expense of a slight loss in color fidelity at these low levels. The eight-bit log exposure pixel values produced by look-up table 135 are routed by leads 140 to an input of missing green pixel interpolation gate array 210.

Missing green pixel interpolation gate array 210 provides three functions. Defect correction function 211 implements one of these functions; while the remaining two functions are implemented within missing green pixel interpolation function 216. First, whenever a defective pixel location is scanned, this gate array, in conjunction with defective pixel ROM 160, substitutes the color value associated with an immediately prior pixel of the same color as that of the present pixel for the value of the present pixel. Thereafter, the gate array calculates the green value associated with each non-green pixel value. This calculated green value, referred to as a missing green pixel value, is then appropriately inserted at the proper time interval into a stream of eight-bit green values that appears on leads 218 and collectively forms a green color plane which contains a green value for each pixel produced by CCD area imager 20. In addition, for each non-green pixel value that occurs in the scanned image, the gate array provides a parallel nine-bit value, on leads 217, that represents the color difference that occurs between the non-green (i.e. red or blue) value and the missing green pixel value associated with this non-green image pixel. Consequently, whenever a non-green pixel occurs in the scanned image, the array substantially simultaneously provides both a missing green pixel value on leads 217 and a corresponding red-green or blue-green color difference value on leads 218. Timing generator gate array 200 generates and, via leads 169, applies suitable timing signals to control the operation of missing green pixel interpolation gate array 210.

In particular, during manufacture of system 100, the performance of CCD area imager 20 is determined through appropriate testing. A defective pixel location is assumed to be any pixel location at which the output voltage produced by the CCD imager produces a corresponding optical intensity that is excessively bright or dim. These locations, particularly those that remain excessively bright, when displayed over several frames of an image scanned by this CCD imager, become, over time, very noticeable and quite annoying to a viewer. As such, during manufacture of system 100, the relative locations of all defective pixels, in terms of their horizontal and vertical addresses within the scanned image field, are stored in a look-up table in defective pixel ROM 160. Now while system 100 is scanning an image, timing generator gate array 200 produces suitable pixel clock and addressing signals on leads 163. These signals provide a relative address within the image of each eight-bit log exposure pixel value that will next appear on leads 140. If this address is stored within defective pixel ROM 160, then this ROM will produce a suitable logic level on lead 166 which in turn is routed to a LOCATION ("LOC") input to defect correction function 211, implemented within missing green pixel interpolator gate array 210, in order to identify the current pixel as being defective. At the same time, an immediately prior pixel value for the same color pixel as that of the defective pixel is supplied over eight-bit path 213 from missing green pixel interpolator function 216 which is also located within missing green pixel interpolator gate array 210. Defect correction function 211, in response to this level and the prior pixel value, substitutes the color value associated with this immediately prior pixel for that of the present defective pixel. A resulting corrected stream of eight-bit single color pixel values is routed over eight-bit path 214 to missing green pixel interpolator function 216. Missing green pixel interpolator function 216 calculates the green pixel value that is associated with each non-green, i.e. red or blue, pixel value in a manner that is discussed in detail below in conjunction with FIG. 3. In addition, as shown in FIGS. 2A-2D, missing green pixel interpolator function 216 also provides, for each non-green image pixel value, a nine-bit value on leads 217 that represents the color difference, in two's complement form, that occurs between that non-green (blue or red) image pixel value and the missing green pixel value corresponding thereto. For each non-green image pixel, the values appearing over leads 217 and 218 occur substantially simultaneously and are routed directly and through respective single line delay elements 220 to chroma interpolator gate array 230. To illustrate the temporal relationship occurring between the color difference values and green missing pixel values, the values appearing on leads 217 and 218 can be viewed, as shown in FIGS. 5A-5D, as simultaneously forming blue-green color difference plane 505, red-green color difference plane 510 and green color plane 515. As shown, green color plane 515 is completely filled with green pixel values; while blue-green (B-G) and red-green (R-G) color difference planes 505 and 510 only contain color difference values that occurred coincident with the occurrence of a missing green pixel value, and more particularly with the occurrence of the color difference value (B-G or R-G) governed by the specific non-green pixel color (blue or red) in the image that is associated with the corresponding missing pixel value.

Chroma interpolator gate array 230, shown in FIGS. 2A-2D, interpolates color difference values in both horizontal and vertical directions in order to transform the scanned image from single color pixel values into a re-constructed image that contains three full color planes. As such, each pixel in the re-constructed image has separate log exposure values for the red, green and blue color content that occurs at the same corresponding pixel location in the scanned image. In addition, chroma interpolator gate array 230 also provides edge enhancement and coring to sharpen image edges and suppress high frequency, low amplitude image noise.

Specifically, chroma interpolator gate array 230 implements vertical color difference interpolator function 232, edge enhancement and coring function 235 and horizontal chroma interpolation and re-combination function 237. Vertical color difference interpolator function 232 determines both red-green and blue-green color differences for each green image pixel value that is vertically situated between two of the same type of color difference values. For example, to provide vertically interpolated blue-green plane 520 shown in FIGS. 5A-5D, the vertical color difference interpolator function would determine the vertically interpolated blue-green color difference value associated with the green pixel value in pixel location 523 (situated within green color plane 515) by averaging, through for example averaging process 521, vertically adjacent blue-green color difference values that are associated with pixel locations 522 and 524. In a similar manner, this function would successively determine, through averaging, interpolated blue-green color difference values for all other green image pixels that are vertically situated between two blue-green color difference values. Likewise, vertical color difference interpolator function 232, shown in FIGS. 2A-2D, would similarly and successively determine, again by averaging, through for example averaging process 526 shown in FIGS. 5A-5D, interpolated red-green color difference values for all green pixels situated at locations, e.g. location 528, that are vertically positioned between pixel locations occupied by two red-green color difference values, e.g. pixel locations 527 and 529 in order to form vertically interpolated red-green plane 525. For ready identification, the vertically interpolated blue-green and red-green color difference values are respectively indicated as $(B-G)_{VI}$ and $(R-G)_{VI}$.

Color difference values are separately though identically determined for the blue-green and red-green color differences and occur in proper temporal sequence on leads 233 and 234, as shown in FIGS. 2A–2D, and occur coincident with corresponding enhanced green pixel values that occur on leads 236, thereby substantially simultaneously generating vertically interpolated B-G and R-G planes 520 and 525 and enhanced green plane 560 shown in FIGS. 5A–5D.

To perform the vertical interpolation, vertical color difference interpolator 232 utilizes color difference values that are associated with the current scan line, i.e. scan line n, and those that are associated with the immediately prior and next preceding scan lines, i.e. scan lines n-1 and n-2. As such, color difference values are directly applied over leads 217 to one input of vertical color difference interpolator function 232 situated within gate array 230 and also successively through separate one line delay elements 222 and 224. The nine-bit outputs of delay elements 222 and 224, which respectively occur at delays of one and two scan lines, are separately applied over leads 225 and 227, respectively, to separate inputs of vertical color difference interpolator function 232.

At the same time that color difference interpolation is occurring within function 232, image edges are enhanced and high frequency, low amplitude noise is suppressed by edge enhancement and coring function 235. This function provides edge enhancement and coring on all the green pixel values lying in green color plane 515 shown in FIGS. 5A–5D, which includes both the green pixel values that were generated by the CCD imager and the missing green pixel values determined by missing green pixel interpolator function 216. Edge enhancement and coring occurs at levels defined by two parameters loaded by micro-controller system 180, via serial link 181, as shown in FIGS. 2A–2D, into edge enhancement and coring function 235. The value of one of these parameters specifies the level of edge enhancement; while, the value of the other parameter specifies the coring level, i.e. a threshold level below which undesirable image noise is said to occur. All high frequency, low amplitude intensity values are taken to be image noise and are suppressed through coring. While coring, depending upon the level chosen, does eliminate some subtleties that occur at low amplitudes in the image, this technique is particularly effective in removing noise. An operator can separately change both the enhancement and coring levels by successively depressing an appropriate pushbutton(s) located within user pushbuttons 192 until the desired levels are reached. Edge enhancement and coring are performed on the green pixel values because, since the CCD imager generates three times as many green pixel values as red and blue pixel values, the green pixel values contain more image resolution than do the red or blue pixel values. All the resulting enhanced green pixel values that are produced by edge enhancement and coring function 235, which includes missing green pixel values that have been enhanced and green pixel values generated by the CCD imager that have been enhanced, collectively form green enhanced pixel plane 570 shown in FIGS. 5A–5D. Line delay 226 is used to delay the incoming green pixel values applied to edge enhancement and coring function 235 by an interval equivalent to one scan line. This delay is necessary to maintain proper temporal synchronization between each enhanced green pixel value produced by function 235 and appearing on leads 236 and each color difference value produced by function 232 and appearing on leads 233 and 234. One line delay elements 222, 224 and 226 are each implemented through illustratively a 560 location eight-bit shift register that operates at the pixel clock frequency.

The synchronized red-green and blue-green color difference values along with the substantially simultaneously occurring and corresponding enhanced green pixel values are applied over leads 233, 234 and 236, respectively, to horizontal chroma interpolator and re-combination function 237.

Figure 3:
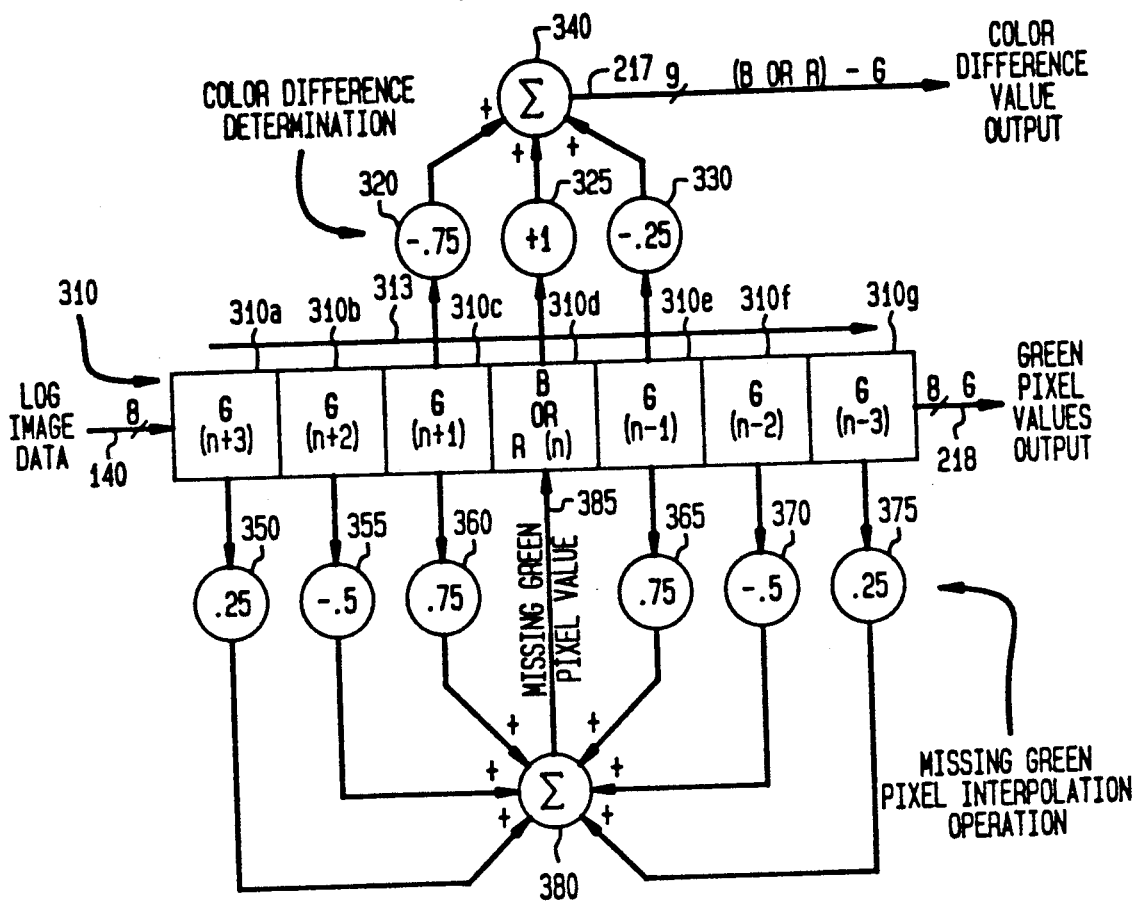
FIG. 3 diagrammatically shows the operations undertaken within missing pixel interpolator function 216 that is provided by missing green interpolation gate array 210 shown in FIGS. 2A-2D.
Figure 4:
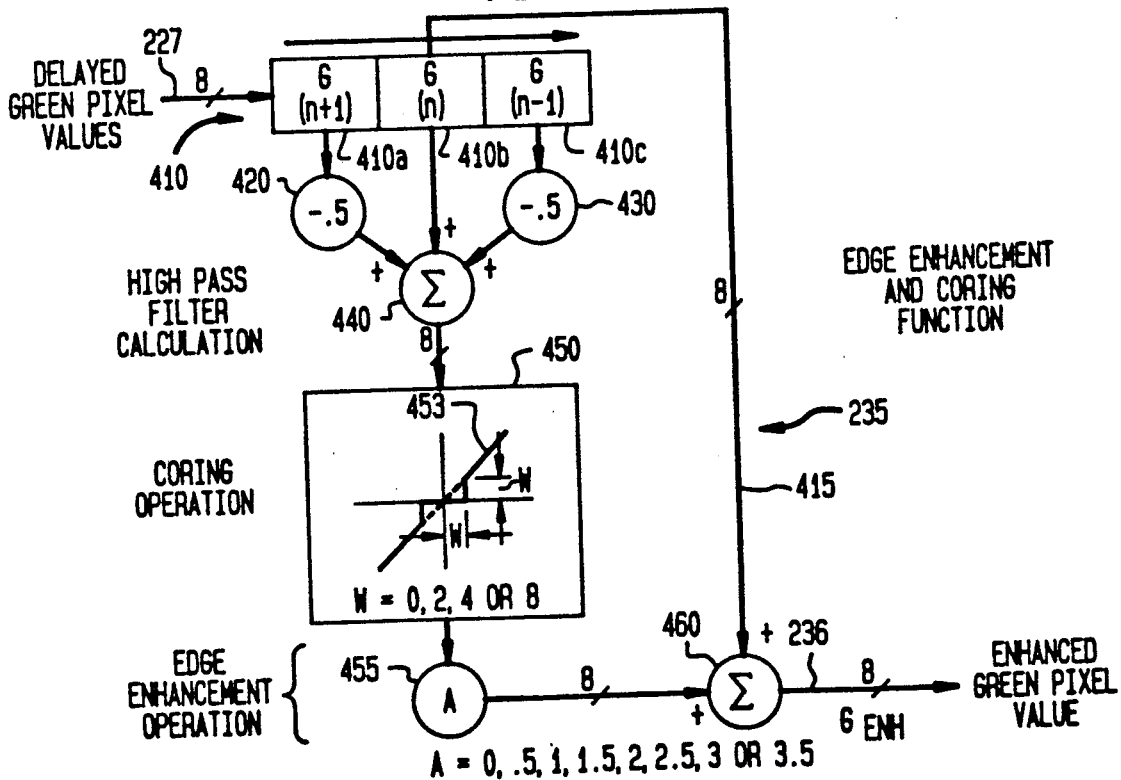
FIG. 4 diagrammatically shows the operations undertaken by edge enhancement and coring function 235 that is provided by chroma interpolator gate array 230 shown in FIGS. 2A-2D.

Now, within function 237, all the blue-green color difference values, including those found through vertical interpolation, are themselves horizontally interpolated to yield a value for each of the pixel locations associated with three green image pixels that are horizontally situated to the right, as indicated for example by arrow 534, as shown in FIGS. 5A–5D, of any B-G color difference value. In performing the horizontal interpolation on horizontally interpolated blue-green plane 535, the three pixel locations, e.g. locations 537, 538 and 539, situated to the right of any given pixel location that contains a B-G color difference (including a vertically interpolated value), e.g. pixel location 536, are assigned a decreasing fractional B-G color difference value equal to 0.75, 0.5 and 0.25 of the B-G color difference value occurring at the given pixel location. The same horizontal interpolation process for horizontally interpolated red-green plane 540 occurs within function 237, shown in FIGS. 2A–2D, for the three pixel locations, for example pixel locations 542, 543 and 544 shown in FIGS. 5A–5D, that would be horizontally situated to the left, as indicated by for example arrow 546, of a pixel location associated with a R-G color difference value, e.g. pixel location 541. For ready identification, the horizontally interpolated blue-green and red-green color difference values are respectively indicated as $(B-G)_{HI}$ and $(R-G)_{HI}$. Once this horizontal interpolation has fully occurred, each pixel location would have three values associated with it: a red-green color difference value, a blue-green color difference value and an enhanced green pixel value, as indicated in FIGS. 5A–5D by fully interpolated blue-green plane 550, fully interpolated red-green plane 560 and enhanced green plane 570. Now, to generate separate enhanced red, blue and green values for each pixel in the re-constructed image, a re-combination function provided by horizontal chroma interpolator and re-combination function 237 separately adds, as symbolized by adders 555 and 565 in FIGS. 5A–5D, the eight-bit enhanced green value associated with that pixel to each of the two eight-bit color difference values that are associated with that pixel. At this point, three resulting separate enhanced eight-bit log exposure color values, i.e. enhanced blue value, enhanced red value and enhanced green value, for each pixel (i,j) in the scanned image produced by the CCD imager, i.e. B (i,j), R (i,j) and G (i,j), substantially simultaneously appear on leads 239 and are routed thereby as separate eight-bit digital signals to appropriate color inputs to color correction accumulator (CCA) 240 as shown in FIGS. 2A–2D. The specific determination of the value of each missing green pixel by missing green pixel interpolator function 216 and the specific edge enhancement and coring technique implemented within edge enhancement and coring function 235 are illustrated in FIGS. 3 and 4 and discussed in detail below in connection therewith. Timing generator gate array 200 generates and, via leads

209, applies suitable timing signals to control the operation of chroma interpolator gate array 230.

Under the control of micro-controller 180, color correction accumulator 240 calculates an accumulated log exposure value for each group of 56 horizontally contiguous pixels in any scan line. Inasmuch as an active scan line contains 560 pixels that are used for color correction, ten such groups of 56 pixels occur along a scan line. Owing to signal processing delays that occur within the CCA, the CCA, under control of micro-controller 180, accumulates two specific groups of pixels for any one color within any scan line. As such and as discussed in detail below in conjunction with FIGS. 6A-6C, five scans are required for the CCA to fully accumulate all the pixel groups for each color; thereby necessitating the need for fifteen separate substantially identical scans, as noted above, of the image on transparency 10 in order to accumulate pixel groups for the three primary colors, red, green and blue. The accumulated value for each accumulated pixel group is provided by CCA 240, via eight-bit parallel data output leads 243, to micro-controller system 180.

The operation of the CCA is synchronized to that of CCD imager 20, sample/hold 123, A/D converter 128, gate arrays 210 and 230 by various timing and control signals produced by timing generator gate array 200 and appearing on leads 206 and 208. Specifically, the specific groups of 56 pixels that are accumulated on any scan line are specified by the value of three BLOCK SELECT bits that are supplied from the micro-controlled system, via eight-bit control leads 184, to CCA 240 and, via leads 185, to timing generator gate array 200. After all pixel accumulations have occurred for an image scan, the micro-controller changes the values of these bits, during an ensuing composite (vertical and horizontal) blanking interval, in order to select the appropriate pixel groups that are to be accumulated during the next scan of the image. At the same time, the micro-controller also specifies to the CCA, via leads 184, which particular primary color (R, G or B) pixels it will accumulate. The CCA accumulates pixel values for a selected color as long as a BLOCK ID pulse from timing generator 200, that appears on leads 208 and is routed via leads 207 to the micro-controller system, remains high. As soon as 56 successive pixels have occurred, the timing generator terminates this pulse. The trailing edge of this pulse causes an interrupt to the micro-controller system and by so doing signifies that an accumulated pixel value data is available at the output of CCA 240 to be subsequently read by the micro-controller. As such, the BLOCK ID pulse, when high, defines an accumulation window for use by the CCA. Now, through use of the value of the BLOCK SELECT bits provided by the micro-controller to timing generator gate array 200 via leads 185, the timing generator temporally offsets the start of the accumulation window for a corresponding interval of time appropriate to the given pixel group that will be accumulated next. The offset in the occurrence of the BLOCK ID pulse, as measured from the start of any scan line, for the different pixel groups that are being accumulated during subsequent scans of the image is clearly evident in FIG. 6B, which will be discussed in detail below.

In addition, further signals are provided over leads 208 by timing generator gate array 200 for use in appropriately synchronizing the operation of CCA 240: a pulse, HORIZ CLOCK, that occurs at the start of every scan line, i.e. at approximately a 15.75 KHz rate; a timing pulse, VERTICAL INDEX, that occurs at the start of every scan; a pixel clock signal, PIXEL CLOCK, that provides a pulse coincident with the occurrence of a pixel; and the ACTIVE VIDEO signal which, when high, indicates pixels occurring within the central 560 pixel by 240 line region within the scanned image. Furthermore, to synchronize the operation of the micro-controller system to the start of each image scan, timing generator gate array 200 provides the VERTICAL INDEX signal and a COMPOSITE BLANKING signal, via leads 206 and 207, to the micro-controller system. This blanking signal indicates the start of the composite blanking interval for each image scan. The CCA is configured and envoked by the micro-controller system through suitable control signals supplied over eight-bit parallel leads 184.

While the CCA provides the accumulated values to the micro-controller via leads 243, the micro-controller, through execution of appropriate software as discussed in detail below, calculates and stores local average values for all the paxels that collectively form an image scan. Thereafter, once all the local average values have been stored, the micro-controller converts all the local averages to the printing density domain. The printing density domain local average values are then used by the micro-controller in calculating appropriate red, green and blue offset correction values in the printing density domain. Next, the micro-controller converts the three printing density domain color correction offset values into the log exposure domain.

The CCA also contains three color offset registers. In addition, unidirectional serial link 183 runs from the micro-controller to CCA 240. In conjunction with serial clock pulses generated by the micro-controller and appearing on lead 182, the micro-controller is able to load an appropriate color correction offset value into any of the three color correction offset registers within the CCA. Consequently, once the micro-controller system has converted the three printing density domain color correction offset values into the log exposure domain, the micro-controller system then serially loads the three resulting log exposure color correction offset values, via lead 182, into appropriate offset registers within CCA 240 for subsequent use in color balancing a subsequent scan of the image.

The system can also automatically set the aperture within iris 113 to achieve a proper level of illumination for the particular image being scanned and hence control image brightness. To accomplish this, CCA 240, once suitably instructed as discussed below by micro-controller system 180, also provides the function of determining the maximum pixel value that occurs within a segment of a scan line. With this information, the micro-controller is then able to determine the maximum pixel intensity value that occurs throughout a paxel. As such and as described in detail below, the CCD imager is instructed by the micro-controller system to scan transparency 10 that has been placed into the light path. During this scan (which precedes the fifteen local average determination scans), the CCA in conjunction with the micro-controller provides the maximum pixel values produced by the CCD imager for a number of paxels that occur throughout the scanned image area. Based upon whether a pre-defined number of maximum pixel values, here illustratively 3% of the total number of maximum pixel values obtained, exceed a given eight-bit threshold value, here the decimal value "240" out of a maximum value of "255", the micro-controller will generate a suitable control signal over leads 193 in order to instruct motor controller 194 to apply appropriate drive voltages to aperture adjust motor 120 in order to incrementally open the aperture. This process iteratively continues until the threshold is reached at which point the aperture will have reached a proper opening. This process is reversed if significantly more than the pre-defined number (illustratively 3%) of the maximum pixel values are produced which exceed the threshold thereby indicating that the scanned image is excessively bright.

Now, to actually color balance a scanned image, the CCA, once instructed by micro-controller 180, adds the appropriate color correction offset value to every pixel that exists in the corresponding color plane. The resulting color balanced RGB eight-bit log exposure pixel values, $R_C$, $G_C$ and $B_C$, appearing at corresponding outputs, $R_O$, $G_O$ and $B_O$, of the CCA and are routed, via leads 245, to respective inputs of multi-paged RAM 250 for gamma correction.

RAM 250 consists of three separate look-up log-gamma tables 252, 254 and 256 which respectively receive corrected red, green and blue log exposure pixel values and collectively and substantially simultaneously provide corresponding appropriate gamma corrected red, green and blue pixel values, RCQ, GCQ and BCQ. Data for each of the three look-up tables is loaded within RAM memory 250 by micro-controller system 180 through leads 255.

Next, the resulting gamma corrected RGB values are applied, via leads 259, to color cross-talk matrix gate array 260 for colorimetry corrections. This correction is performed by multiplying the gamma corrected color values for all corresponding RGB pixel values by a 3-by-3 matrix with pre-settable coefficient values. Specifically, for any image pixel (i,j) the color cross-talk matrix implements the following equations:

$$R_{CC} = (C_{RR} * R_{C\gamma}) + (C_{GR} * G_{C\gamma}) + (C_{BR} * B_{C\gamma}) \quad (1)$$
$$G_{CC} = (C_{RG} * R_{C\gamma}) + (C_{GG} * G_{C\gamma}) + (C_{BG} * B_{C\gamma}) \quad (2)$$
$$B_{CC} = (C_{RB} * R_{C\gamma}) + (C_{GB} * G_{C\gamma}) + (C_{BB} * B_{C\gamma}) \quad (3)$$

where:

$R_{CC}$, $G_{CC}$ and $B_{CC}$ are the colorimetry corrected red, green and blue pixel values for image pixel (i,j), diagonal coefficients, $C_{RR}$, $C_{GG}$ and $C_{BB}$, are programmed to any value, in 1/16 increments, situated either in the range $-15/16$ to $+15/16$ or in the range of $+1/16$ to $+47/16$, and off-diagonal coefficients, $C_{GR}$, $C_{BR}$, $C_{RG}$, $C_{BG}$, $C_{RB}$ and CGB, are programmed to any value, in 1/16 increments, in the range of $-15/16$ to $+15/16$.

In addition to eliminating unwanted color cross-talk, the color cross-talk matrix through suitable selection of the coefficients can also provide digital color boost and reduction, and/or contrast (gamma) manipulation. The desired value for each particular coefficient is loaded, via leads 263, by micro-controller system 180. The specific value to be used are chosen based upon regression analysis of the chromatic response of film and the phosphors in a typical video display monitor.

The colorimetry corrected red, green and blue pixels provided by color cross-talk matrix gate array 260 are routed over leads 265 to digital to analog (D/A) converters 270 which includes separate D/A converters 272, 274 and 276 for the red, green and blue values appearing on leads 265. These converters convert the eight-bit digital color values into separate corresponding RGB analog video signals. To substantially remove any high frequency noise from these video signals, the separate RGB analog video signals are routed through low pass filters 280 which contains separate filters 282, 284 and 286 for the red, green and blue analog signals.

The analog RGB video signals are applied over leads 283, 285 and 287, respectively, to corresponding amplifiers 294, 296 and 298 situated within amplifiers 290. These amplifiers provide buffering and sufficient drive capability to these analog signals. In addition, to synthesize a composite NTSC video signal, the separate RGB analog video signals are applied to respective inputs of NTSC video encoder 175 along with suitable NTSC timing and synchronization signals appearing over leads 205 and generated by timing generator gate array 200. A composite video synchronization signal appearing o leads 205 is also applied to amplifier 292 to impart sufficient drive capability to the signal. The RGB analog outputs, the amplified synchronization signal from amplifiers 290 and the NTSC composite video signal are collectively routed over leads 295 as the analog video output signals available from system 100.

Micro-controller system 180 also provides a VCR PAUSE CONTROL signal on lead 186 to appropriately start and stop an external video cassette recorder (VCR) in recording video information for each transferred transparency. A serial RS-232 port is also provided to the micro-controller system as an interface to an external device, such as a suitable remote computer or dedicated remote control unit. Front panel user push-buttons 192, connected via leads 191, allow an operator to suitably instruct the micro-controller system to appropriately alter system operation. In addition, micro-controller system 180 is interfaced, via leads 189, to LED (light emitting diode) Display 190. This display, typically three 7-segment LED numeric digits, provides a numeric indication of system operation, e.g. the number of a transparency presently being transferred to video, as well as various error codes, codes for various user programmable settings and the like. Various limit switches provide current positional information over leads 195 regarding the moveable film transport and scanning components within system 100, e.g. whether a slide tray has reached a "home" position, whether the CCD imager is near a home position, whether a slide is in position in the light path and the position of the armatures of the various drive motors, i.e. aperture adjust motor 120, a motor (not shown) to move a current slide (up/down) into or out of the light path, a motor (not shown) to rotate the slide tray, and slide position motor(s) (also no shown) for incrementally moving slide situated in the light path in the directions indicated by arrows 107. All these motors are controlled by motor controllers 194 which operate in response to suitable signals appearing over leads 193 and generated by micro-controller system 180.

Micro-controller system 180 illustratively uses a model 8031 eight-bit micro-computer currently manufactured by the Intel Corporation of Santa Clara, California as a processing element. The micro-computer contains on-board input/output ports and utilizes external data (RAM) and program (ROM) memory.

All the gate arrays that are used within system 100, notably timing generator gate array 200, missing green pixel interpolation gate array 210, chroma interpolator gate array 230, CCA 240, and color cross-talk matrix gate array 260 are semi-custom gate arrays, i.e. so-called application specific integrated circuits. All these gate arrays are currently manufactured by the Eastman Kodak Company located in Rochester, New York under the following part numbers, with alternate manufacturer designations listed in parenthesis: 232830 (G507) for the timing generator, 232826 (G402) the missing green pixel interpolator gate array, 232827 (G502) for the chroma interpolator gate array, 232829 (G504) for the CCA, and 232828 (G503) for the color cross-talk matrix. All the functions provided by these gate arrays as described above and in detail below are implemented through appropriate logical functions that have been transformed into custom metallization patterns that interconnect standard digital logic components that exist within these arrays. Inasmuch as those skilled in the art can readily fabricate the logical functions and metallization patterns used in each gate array from the functional descriptions given herein, the implementation of the gate arrays will not be discussed any further.

2. Missing Green Pixel Interpolation and Color Difference Determination Operations As discussed above, missing green pixel interpolator 216, shown in FIGS. 2A-2D, provides two functions. First, the interpolator inserts (missing) green pixel values into a green color plane at those pixel locations that are associated with non-green pixel values produced by the CCD imager. Second, for each non-green pixel value that occurs in the scanned image, the interpolator provides a parallel eight-bit value that represents the color difference that occurs between the non-green (i.e. red or blue) value and the missing green pixel value associated with this non-green image pixel.

In particular, FIG. 3 functionally shows the operations undertaken within missing pixel interpolator function 216. Although interpolator 216 is implemented through suitable logical functions, the missing green pixel interpolation and color difference determination operations will be explained using equivalent digital circuit elements. Now, with this in mind, to determine the value of each missing green pixel, incoming log exposure pixel values appearing on lead 140 are shifted, at the pixel clock rate, into seven location (position) eight-bit shift register 310 which includes separate locations 310a, 310b, 310c, 310d, 310e, 310f and 310g. When the red or blue color value associated with a non-green pixel location is shifted into center location 310d, the green value that is to be placed in this center pixel location is taken to be a predetermined linear combination of the green values that appear in the surrounding six green pixel locations. Specifically, function 216 implements the following equation:

$$MGP(n) = .25[(G(n-3) + G(n+3)] - .5[G(n-2) + G(n+2)] + .75[G(n-1) + G(n+1)]\quad (4)$$

where: MGP(n) is the missing green pixel value for the red or blue color value occurring at pixel location n.

To functionally implement this equation, the green color values appearing in locations 310a, 310b, 310c, 310e, 310f and 310g are weighted by multipliers 350, 355, 360, 365, 370 and 375 by the respective coefficients 0.25, −0.5, 0.75, 0.75, −0.5 and 0.25. The weighted green pixel values are then additively combined by summer 380 with a resultant sum placed as the missing green pixel value, in lieu of the red or blue color value, into center location 310d of shift register 310. All the green pixel values, including the missing green pixel value, are then shifted, to the right as shown by arrow 313, out of shift register 310 onto lead 218 at the pixel clock rate to collectively form green color plane 515 shown in FIGS. 5A-5D.

To determine a color difference value, a pre-determined linear combination is calculated of the red or blue color value and the green color values located in the two surrounding horizontally adjacent green pixel locations. When the red or blue color value associated with a non-green pixel location is shifted into center location 310d shown in FIG. 3, the applicable color difference value is calculated as a pre-determined linear combination of the green values that appear in adjacent locations 310c and 310e. Specifically, the color difference value, either blue-green, (B-G), or red-green, (R-G), is given by the following equations:

$$CDIFF = NGP(n) - 0.75[G(n+1)] - 0.25[G(n-1)] \text{ if } G(n+1) > G(n-1) \quad (5)$$

or $$CDIFF = NGP(n) - 0.75[G(n-1)] - 0.25[G(n+1)] \text{ if } G(n-1) > G(n+1) \quad (6)$$

where:
CDIFF is the determined color difference value, namely R-G or B-G; and
NGP(n) is a red or blue color value occurring at non-green pixel location n.

To simplify the figure, only the functional equivalent equation (5) is shown and described. Equation (6) would have a very similar functional representation. In particular, to functionally implement equation (5), the red (or blue) color value appearing in center location 310d and the green color values appearing in locations 310c and 310e are weighted by multipliers 320, 325 and 330 by the respective coefficients −0.75, 1.0 and −0.25. The weighted pixel values are then additively combined by summer 340 with a resultant nine-bit red-green (or blue-green) color difference value appearing on leads 217 and collectively form red-green (or blue-green) color difference plane 505 (or plane 510) as shown in FIGS. 5A-5D.

3. Edge Enhancement and Coring Function 235

As discussed above, edge enhancement and coring function 235 enhances image edges and suppresses image noise that takes the form of high frequency, low amplitude intensity values. This function operates on all the green pixel values that appear on eight-bit leads 227 and hence collectively form the green color plane.

FIG. 4 functionally shows the operations undertaken by edge enhancement and coring function 235. Although edge enhancement and coring is also implemented through suitable logical functions embedded within gate array 230 (see FIGS. 2A-2D), edge enhancement and coring will be explained, where possible, using equivalent digital circuit elements.

As shown, incoming eight-bit green pixel values appearing on lead 227 are shifted into three position eight-bit shift register 410 which includes separate locations 410a, 410b and 410c. First, a linear combination of three successive green pixel values, G(n+1), G(n) and G(n−1), is additively formed by summer 440 with the first and third green pixel values, G(n+1) and G(n), being weighted by the value −0.5 through multipliers 420 and 430, respectively, to provide a high pass filter.

The resulting output of summer 440 is applied to coring operation 450. This operation utilizes coring function 453 that passes unchanged all green pixel values with a value equal to or greater than the value of threshold "w" and removes those values that are less than this threshold. The value of threshold "w" can be set to either 0, 2, 4 or 8 by micro-computer system 180 (see FIGS. 2A-2D), through leads 181, and can be subsequently changed by the operator, through depression of appropriate ones of pushbuttons 192, in order to provide a different level of noise suppression. As such, this operation removes high frequency, low amplitude intensity values from the incoming green pixel stream to suppress image noise. As shown in FIG. 4, the output of coring function 450 is routed through multiplier 455 which, in conjunction with summer 460, provides edge enhancement. The multiplier can be set to multiply all the cored green pixels value by one of eight different scale factors: 0, 0.5, 1.0, 1.5, 2.0, 2.5, 3.0 or 3.5. The scale factor is initially set by micro-computer system 180 (see FIGS. 2A-2D), through leads 181, and can be subsequently changed by the operator, through depression of appropriate ones of pushbuttons 192, in order to provide a different level of image sharpness. The resulting green pixel values produced by summer 460, shown in FIG. 4, are routed to leads 236 as the enhanced green values that collectively form enhanced green plane 570 shown in FIGS. 5A-5D.

4. Paxel Fabrication

As noted above, separate local average values of all 56 pixel by 30 line image portions ("paxels") in each of fifteen substantially identical image scans are determined for use in converting the RGB log exposure color values into the printing density domain.

Figure 6A:
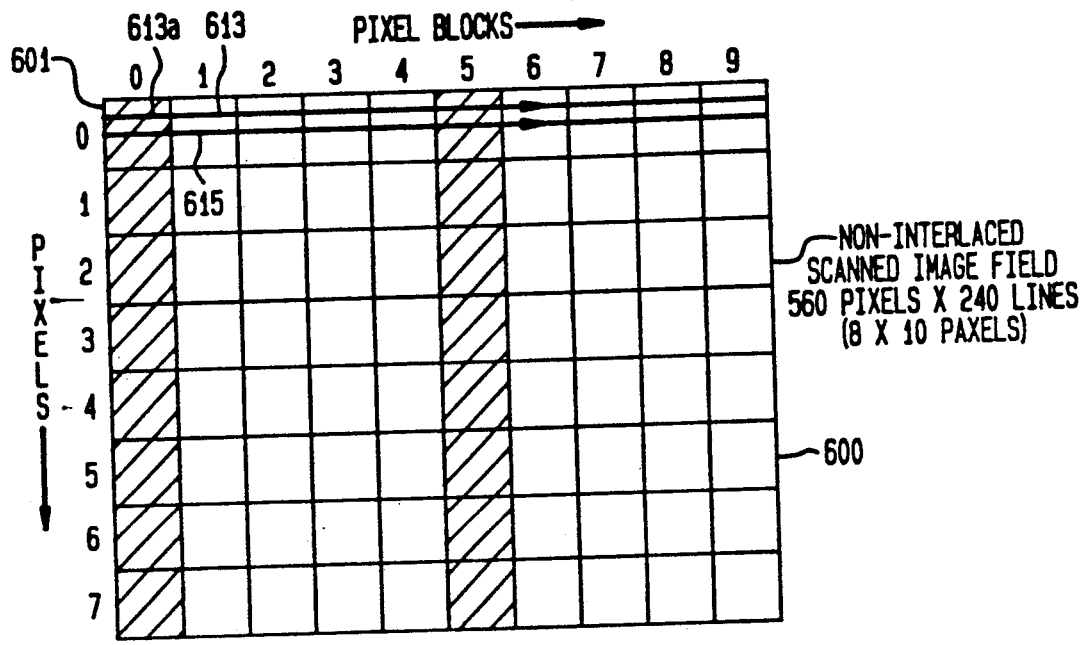
FIG. 6A diagrammatically shows the manner in which an image scan is divided into paxels for determination of local average values associated therewith.
Figure 6B:
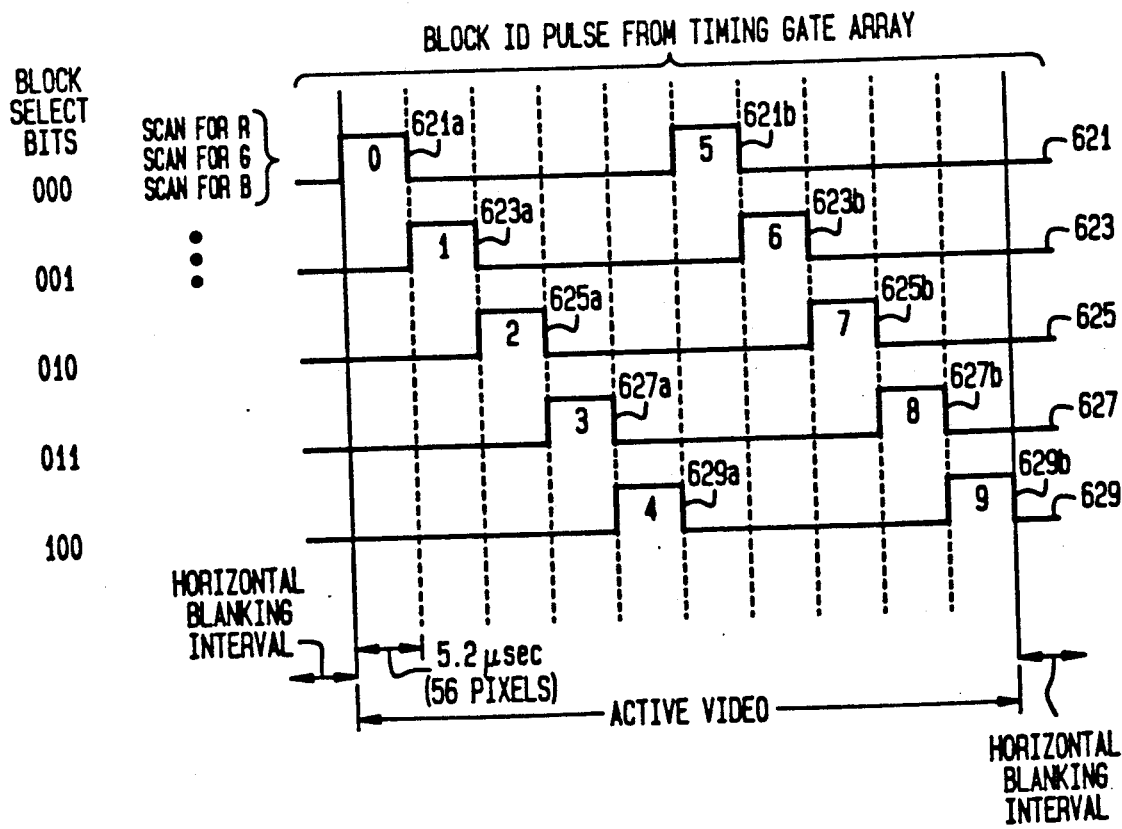
FIG. 6B timing chart that shows the relative times of occurrence of a BLOCK ID pulse and the associated block (column) of accumulated pixel values that is determined during each occurrence of this pulse throughout fifteen separate image scans.
Figure 6C:
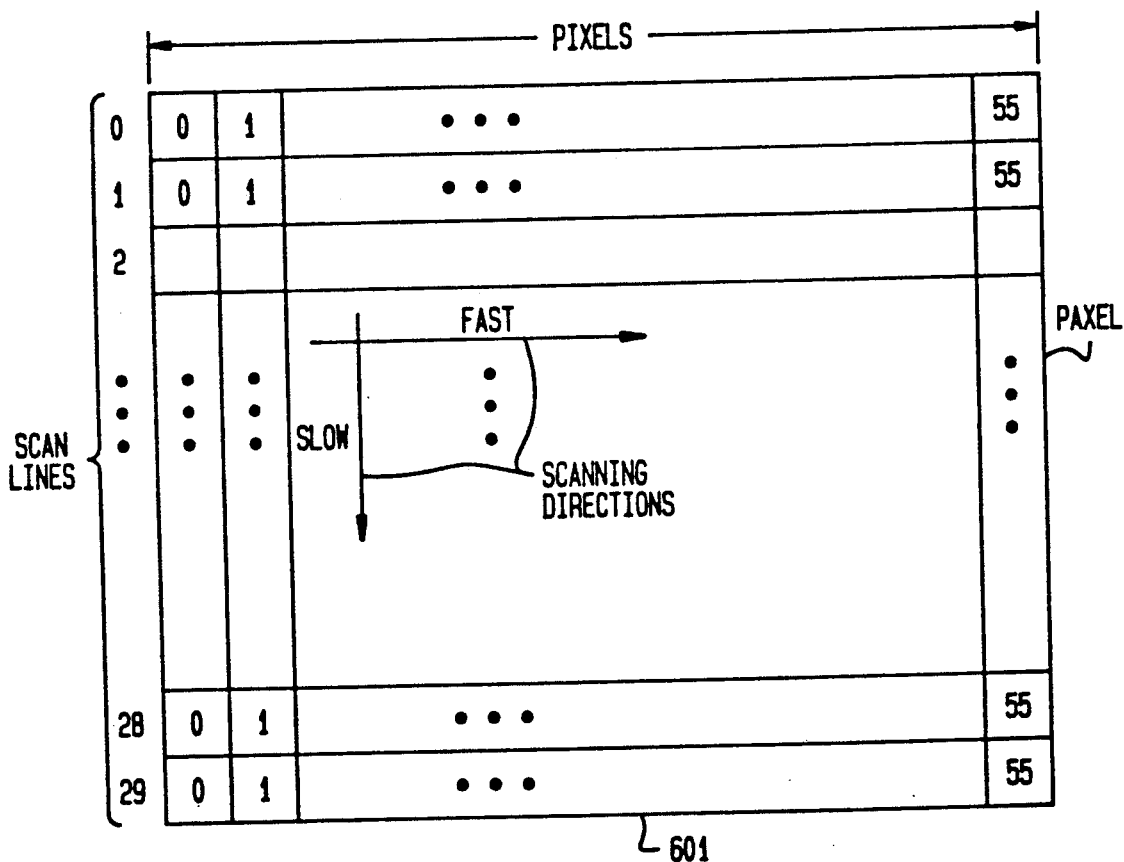
FIG. 6C depicts the constituent pixels that form illustrative paxel 601 shown in FIG. 6A.

The manner in which an image scan is partitioned into separate paxels is shown in FIG. 6A with illustrative paxel 601 shown in FIG. 6C. In particular, image scan 600, with an active central 560 pixel by 240 line region, is divided into blocks (columns) numbered from 0 to 9 and rows numbered 0 to 7. As such, this partitions the image scan into 80 separate identically sized regions, each of which is called a paxel. Each paxel, such as paxel 601, contains 30 vertically contiguous groups (on 30 consecutive scan lines) of 56 horizontally contiguous pixels. For illustrative purposes, two separate scan lines 613 and 615 are also shown.

To form all the paxels, as discussed in detail above, CCA 240 (see FIGS. 2A-2D) under the control of the timing generator first accumulates the values for each 56 pixel group, such as group 613a situated on scan line 613, for any one color and then presents the accumulated result to the micro-controller system. Thereafter, the micro-controller system, in turn, calculates and stores an average pixel value for that group and for that color. After such a pixel average has been calculated for every 56 pixel group in each of fifteen image scans, the micro-controller system calculates a local average for the pixel averages that occur in each block for 30 vertically contiguous scan lines, thereby defining a local average for each different paxel that occurs throughout the fifteen image scans.

To form the proper pixel accumulations, the timing generator produces the BLOCK ID pulse which, when high, defines an appropriate accumulation window for the CCA and, at the trailing edge of this pulse, causes an interrupt to the micro-controller that indicates when the CCA completes pixel accumulation on any scan line and hence when the resulting accumulated data can be read by the micro-controller. The BLOCK SELECT signals provided by the micro-controller to the timing generator define the blocks in which pixel accumulation is to occur and are used by the timing generator to temporally offset the rising edge of the BLOCK ID pulse by an interval of time appropriate to the particular block that is to be accumulated.

In this regard, FIG. 6B is timing chart that shows the relative times of occurrence of a BLOCK ID pulse and the associated block (column) of accumulated pixel values that is determined during each occurrence of this pulse throughout fifteen separate image scans. As shown, throughout any image scan, two separate pixel accumulations for any one color plane alternately occur during any scan line. Specifically, during the first three of fifteen substantially identical image scans, during which the three BLOCK SELECT bits are set to a value of "000", pixel accumulation alternately occurs for blocks zero and five, which for clarity are shown as shaded in FIG. 6A. The first of these three scans provides accumulated pixel values for blocks zero and five in the red color plane, the next of the three scans provides accumulated pixel values for the same blocks in the green color plane and the third of the three scans provides accumulated pixel values also for these same blocks in the blue color plane. As such and as shown in FIG. 6B, during each scan line in these three image scans, each BLOCK ID pulse, here pulses 621a and 621b on waveform 621, rises at the onset of each of these blocks and falls immediately after the occurrence of each group of 56 horizontally contiguous pixels in these blocks. The number located within each pulse indicates the specific block for which pixel accumulation is occurring. Once all groups of 56 pixels have been accumulated in blocks zero and five for each of the three color planes, the image is scanned three more times (specifically scans four through six out of fifteen) to determine accumulated pixel values for blocks one and six. Specifically, as shown, the value of the BLOCK SELECT bits is changed to "001" which, in turn, causes the timing generator to offset the occurrence of the rising edge of the BLOCK ID pulses, here shown as pulses 623a and 623b on waveform 623, from the start of each scan line by an interval equivalent to 56 pixels, i.e. approximately 5.2 micro-seconds ($\mu$sec) to accumulate pixels that are situated in blocks one and six. In a similar fashion, accumulated RGB pixel values are then obtained during another three successive image scans (scans seven through nine out of fifteen) for blocks 2 and 7, during three following image scans (scans ten through twelve out of fifteen) for blocks 3 and 8, and during the last three of fifteen image scans (i.e. scans thirteen through fifteen) for blocks 4 and 9. Immediately prior to each of these nine subsequent scans, the BLOCK SELECT bits are set to appropriate values in order to generate BLOCK ID pulses 625a and 625b on waveform 625, BLOCK ID pulses 627a and 627b on waveform 627, or BLOCK ID pulses 629a and 629b on waveform 629 that are all temporally offset, from the start of each scan line, by an amount corresponding to the specific blocks being accumulated.

5. Software Considerations

The software executed by micro-computer system 180 which implements automatic color balancing is formed of Main Program 700 and Automatic Color Balancing Routine 800. Other software such as well-known keyboard interrupt routines, display routines, analog output routines, timing routines and the like which execute within the micro-computer system and perform functions totally unrelated to automatic color balancing have been omitted for the sake of brevity. Nonetheless, the omitted software would be readily apparent to those skilled in the art.

a. Main Program 700

Main Program 700, when executed, as pertains to automatic color balancing, determines the log exposure paxel values for the red, green and blue color planes in the re-constructed image, converts each log exposure paxel value to the printing density domain, calls automatic color balancing routine 800 to determine the RGB color correction offset values in the printing density domain, and converts the three color correction offset values from the printing density domain into the log exposure domain and finally loads the three resulting log exposure offset correction values into the CCA offset registers for subsequent use in correcting the image stored on the transparency.

Figure 7B:
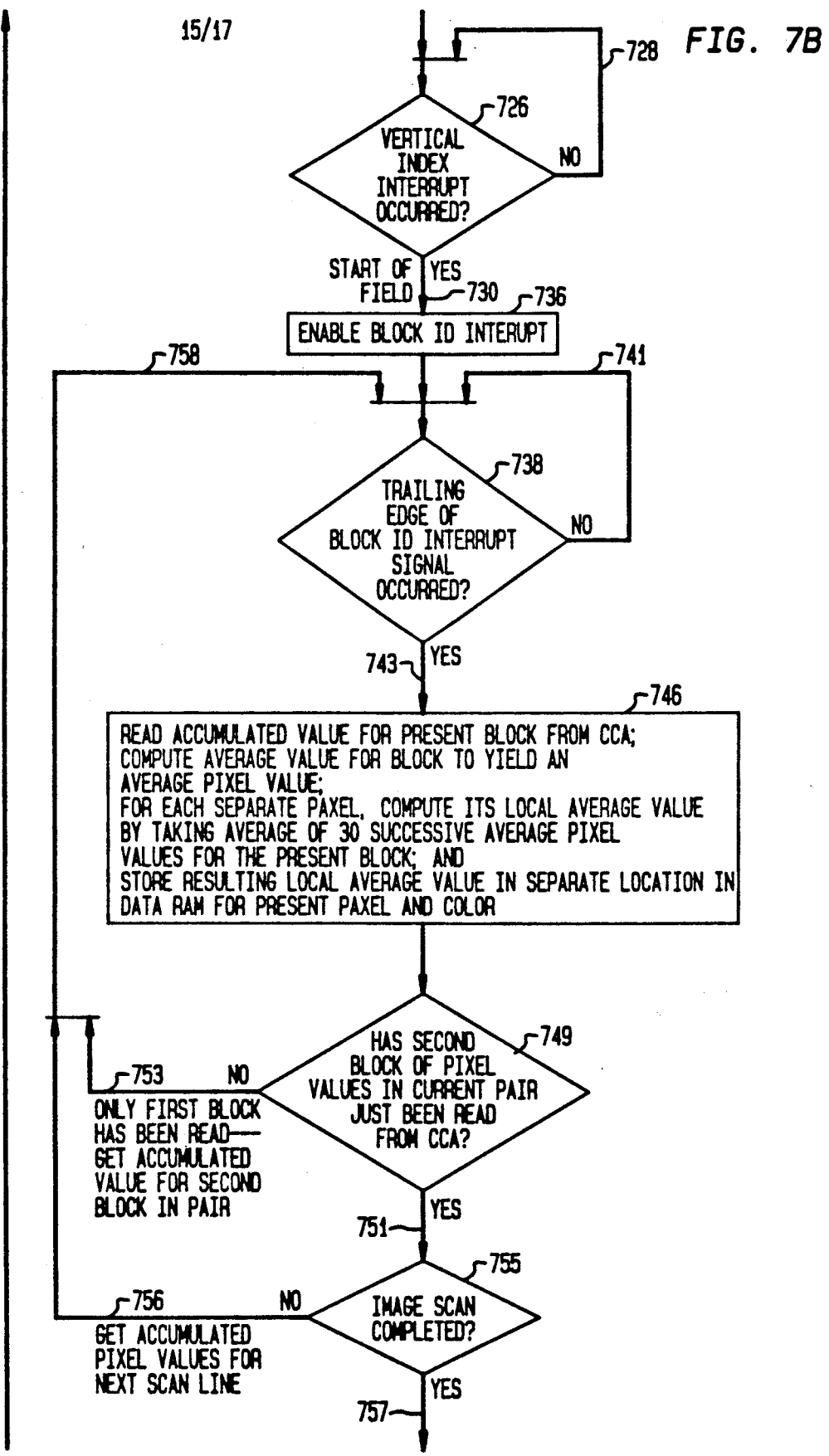
Figure 7C:
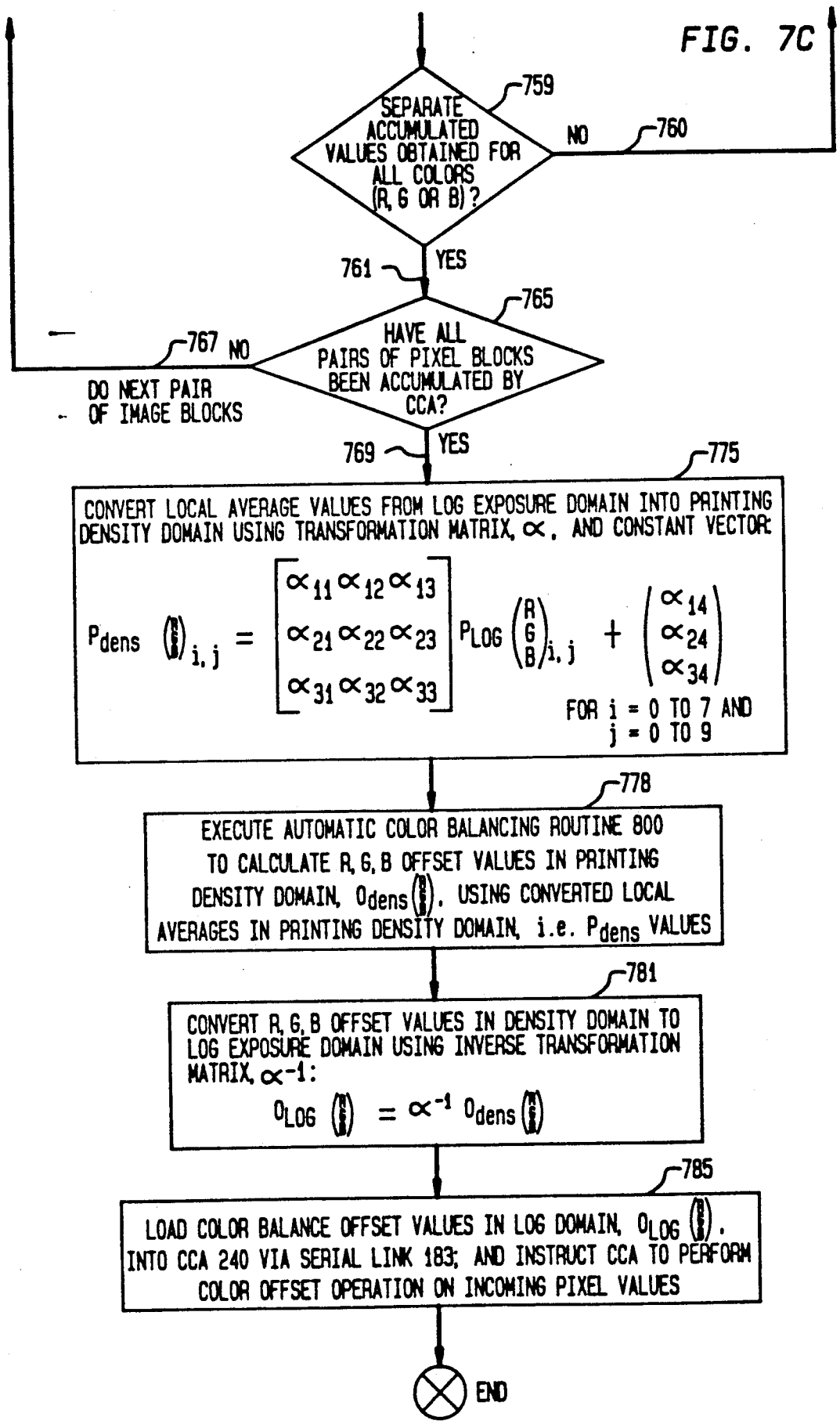

A flowchart of Main Program 700 is collectively depicted in FIGS. 7A-7C, for which the correct alignment of the drawing sheets for these figures is shown in FIG. 7.

As shown, upon entry into Main Program 700, typically through a power-on reset or other reset condition, execution first proceeds to block 703. This block, when executed, appropriately initializes the micro-controller system; then loads the look-up tables, specifically log-gamma tables 252, 254 and 256 into RAM 250 (see FIGS. 2A-2D); thereafter, loads various coefficient values, specifically those into color cross-talk matrix gate array 260; and finally executes various diagnostic operations. After these operations have occurred, execution proceeds, as shown in FIGS. 7A-7C, to block 706. This block, when executed, instructs the micro-controller system to apply appropriate analog control signals to the motor controllers in order to rotate the slide tray into a desired position and then move a slide situated at that position in the tray into the light path. Thereafter, block 709 executes to set the aperture within iris 113 (see FIGS. 2A-2D) to the proper opening. Specifically, block 709 shown in FIGS. 7A-7C first causes the micro-controller system to provide appropriate signals over leads 184 (see FIGS. 2A-2D) to set up CCA 240 to determine the maximum pixel intensity that will occur throughout a span of 56 horizontally contiguous pixels. Thereafter, block 709, during an immediately following image scan (which precedes the fifteen local average scans) and in conjunction with the CCA, obtains the maximum pixel intensity values that occur throughout various paxels situated throughout in the scanned image. Once the scan has occurred, the maximum data values for these paxels are tested to determine if 3% of these values have a value that exceeds a predetermined threshold decimal value of "240". If less than 3% of the maximum values exceed the value "240", then block 709 instructs the motor controllers to open the aperture by a finite pre-set incremental amount. The process of determining maximum pixel values for these paxels and testing the results obtained thereby is iteratively repeated until an aperture opening is reached at which 3% threshold is approximately met. Alternatively, if the threshold is appreciably exceeded, then the aperture is closed through execution of block 709 (though not specifically shown as part of this block) by an incremental amount(s) until the threshold is approximately met. Once the aperture has been properly set, execution proceeds from block 709 to block 712. The latter block, when executed, causes the micro-controller system to provide appropriate signals over leads 184 (see FIGS. 2A-2D) to set up CCA 240 to perform pixel accumulation. This includes appropriately configuring the CCA and then envoking the accumulate function.

At this point, execution sequentially proceeds through blocks 715-765 during which pixel accumulation occurs for fifteen successive image scans in order to provide accumulated RGB pixel data for all blocks in the image. Specifically, block 715, when executed, sets the value of the BLOCK SELECT bits to an appropriate number to signify the blocks of pixels that will be accumulated. Once this has occurred, execution proceeds to block 720 to select the appropriate color plane, R, G or B, from which pixel data will be accumulated. Thereafter, execution proceeds to block 723 which enables a VERTICAL INDEX interrupt on the micro-controller system to determine the start of an image scan. Execution then proceeds to decision block 726 which determines when a VERTICAL INDEX interrupt occurs. If such an interrupt does not occur, then this decision block iteratively executes, via NO path 728, until this interrupt occurs. At the occurrence of a VERTICAL INDEX interrupt, which signifies the beginning of an image scan, execution proceeds, via YES path 730, to block 736. This latter block, when executed, enables a BLOCK ID interrupt such that the micro-controller is able to respond to a BLOCK ID pulse. Once this occurs, execution proceeds to decision block 738 to await the occurrence of a trailing edge in a BLOCK ID pulse. As noted, the CCA accumulates 56 pixel values prior to the occurrence of this edge. As long as this trailing edge does not occur, decision block 738 iteratively executes through NO path 741. When this interrupt finally occurs, execution proceeds, via YES path 743 emanating from decision block 738, to block 746. Block 746, when executed, reads the accumulated pixel value from the CCA, uses that value in calculating a local average value for a current paxel and finally stores that local average value for that paxel in a location in external RAM memory (located within the micro-controller system but external to the micro-computer itself) that corresponds to that paxel and the specific color plane being processed. In particular, the CCA provides each accumulated pixel value as a sum of 56 horizontally contiguous pixel values divided by the decimal number "64". The micro-controller system, during execution of block 746, reads a current accumulated value and then scales that value to generate a properly scaled pixel average value. Then, to compute a local average value for the current paxel, the micro-controller system determines the average value of 30 successive scaled average pixel values for the current block. This local average value is then stored in data RAM. Once all the local average values have been computed, an 8 by 10 by 3 array of log exposure local average values results. After block 746 has fully executed, execution then passes to decision block 749. This decision block, when executed, determines whether a second of two selected blocks of pixel values for the present scan line has just been accumulated by the CCA. If only a first block and not the second, e.g. block zero but not block five as shown in FIGS. 6A and 6B, has just been accumulated, then decision block 749 routes execution as shown in FIGS. 7A-7C, via NO path 753 and path 758, back to decision block 738 to await the generation of the accumulated value for the second of the two blocks for the present scan line and so on. Alternatively, if accumulated values have been generated for both blocks on any scan line, then decision block 749 routes execution, via YES path 751 to decision block 755. This latter decision block determines whether all scan lines in the image have been processed, i.e. whether additional accumulations need to be made for the current image scan. If additional scan lines remain to be processed, then decision block 755 routes execution, via NO path 756 and path 758, back to decision block 738 to await the generation of the first BLOCK ID interrupt for the next successive scan line in the current image scan and so on. Alternatively, if the current image scan has been completely processed, then decision block 755 routes execution, via YES path 757, to decision block 759. This latter decision block, when executed, determines whether pixel accumulations have been obtained for all three primary colors, i.e. red, green and blue, for the blocks presently being accumulated. If accumulations have not been obtained for all of these colors, then decision block 759 routes execution, via NO path 760, back to block 720 to select the next successive color and so on. Alternatively, if all pixel accumulations for the current pair of blocks have been obtained for all three primary colors, then decision block 759 routes execution, via YES path 761, to decision block 765 which, when executed, determines if accumulated pixel values have been obtained for all pairs of blocks. If any pair of blocks of pixels remain to be accumulated, then decision block 765 routes execution, via NO path 767, back to block 715 in order to select the next successive pair of blocks of pixels to be accumulated and so on. Once all the blocks of pixels have been accumulated, execution proceeds, via YES path 769 emanating from decision block 765, to block 772. At this point, accumulated RGB pixel values are stored in RAM for each corresponding group of 56 horizontally contiguous pixels that exists in the three primary color planes of the re-constructed image.

At this point, the RGB color correction offset values are calculated through sequential execution of blocks 775-785. At this point, an 8 by 10 by 3 array of log exposure local average values exists, i.e. $P_{LOG}(R,G,B)_{i,j}$ where i runs from 0 to 7 and j runs from 0 to 9. Now, block 775, when executed, converts each RGB local average value from the log exposure domain into the printing density domain. This conversion is accomplished by multiplying each three color log exposure local average value, $P_{LOG}(R,G,B)_{i,j}$, by 3-by-3 conversion matrix, $\alpha$, and then adding a constant vector to yield a corresponding three color density local average value, $P_{dens}(R,G,B)_{i,j}$. This conversion involving multiplication by a 3-by-3 matrix and subsequent addition of a constant vector may be collectively viewed as multiplication by a 3-by-4 matrix, with the proviso that the multiplicand vector is thought of as having a fourth component equal to unity. In fact, such a conversion will be hereinafter referred to as multiplication by a 3-by-4 matrix.

This conversion establishes a correspondence between re-constructed digital color values originating from the CCD imager when it is illuminated with a specifically color light of a given intensity and the printing densities measured from a specific kind of film when it is exposed to light of the same color and intensity. Inasmuch as colors are infinitely variable across a continuous spectrum, but are only measured in terms of three numbers (for the red, green and blue primary colors) representing different spectral sensitivities of the film and of the sensor, there is no conversion that will yield exact conversions for all incoming colors. However, in practice, it has been found that a 3-by-4 matrix of coefficients provides very satisfactory results. With this in mind, the coefficients in matrix $\alpha$ are previously determined in the following manner. First, a set of colors is chosen which reflects the colors present in a typical scene. Given these colors, both the film based printing density values and the re-constructed color values are determined which correspond to each chosen color. This can be done either by direct measurement of the chromatic response of or by calculation from known properties of the film and CCD imager. Thereafter, a set of matrix coefficients that minimizes errors that occur in estimating the printing density values from the re-constructed color values is determined by mathematical optimization, such as through non-linear least squares fitting. The values of all these coefficients are stored within external program memory situated within the micro-controller system.

Now, once all the three color log exposure local average values have been converted into the printing density domain, then execution passes from block 775 to block 778. This latter block executes Automatic Color Balancing Routine 800, which is discussed below in conjunction with FIGS. 8A and 8B. This routine calculates the RGB offset correction values in the density domain, i.e. $O_{dens}(R,G,B)$, based upon the converted three color local average values. Once the three offset correction values have been calculated, execution proceeds to block 781, which converts these values back into the log exposure domain. This conversion is accomplished by multiplying a single dimensional vector containing the three density based color correction offset values by the inverse of conversion matrix $\alpha$. Then, through execution of block 785, the resulting log exposure color correction offset values, i.e. $O_{LOG}(R,G,B)$, are then loaded into CCA 240 (see FIGS. 2A-2C) via serial link 183. Once this occurs, block 785 instructs the CCA to perform a color correction offset operation on each subsequent incoming RGB pixel value in a subsequent scan of the image in order to balance the colors therein. Once this occurs, execution exits from Main Program 700.

b. Automatic Color Balancing Routine 800

Automatic Color Balancing Routine 800, when executed as part of Main Program 700, determines the printing density domain red, green and blue offset correction values, i.e. $O_{dens}(R,G,B)$, from the printing density domain red, green and blue paxel values.

A flowchart of Automatic Color Balancing Routine 800 is shown in FIG. 8. While this flowchart shows a preferred color balancing technique applicable to use in the printing density domain, i.e. used in color balancing images for transfer from photographic negatives or transparencies to photographic paper, other such printing density domain based color balancing techniques may be used instead.

As shown, upon entry into routine 800, execution proceeds to block 810. This block, when executed, converts each density domain local average RGB value, $P_{dens}(R,G,B)_{i,j}$, from RGB color space to a different three dimensional color space, i.e. Neutral (NEU) - Green-Magenta (GRM) - Illuminant (ILL). As shown, the neutral and green-magenta local average values for paxel (i,j) are functions ($f_1$ and $f_2$, respectively) of the red, green and blue color plane values for this paxel, i.e.

R(i,j), G(i,j) and B(i,j); while, the illuminant local average value for pixel (i,j) is a pre-defined function ($f_3$) of only the red and blue color plane values for this pixel. In particular, this conversion is given by the following three equations:

$$NEU(i,j) = [R(i,j) + G(i,j) + B(i,j)]/\sqrt{3} \quad (7)$$

$$GRM(i,j) = [R(i,j) - 2G(i,j) + B(i,j)]/\sqrt{6} \quad (8)$$

$$ILL(i,j) = [-R(i,j) + B(i,j)]/\sqrt{2} \quad (9)$$

Once each of the printing domain RGB local average values has been converted into the NEU-GRM-ILL color space, execution proceeds to block 820. This block, when executed, determines the neutral transfer density (TDNEU) as a pre-defined function, $f_4$, of maximum, minimum and average values of the printing density domain neutral, red and blue local average values for i running between 0 to 7 and j running from 1 to 8. Specifically, block 820 first calculates all the following parameters:

TAVTF = the average of NEU(i,j) for i=0 to 7, and j=1 to 8;
TAVLG = the average of NEU(i,j) for i=1 to 6, and j=2 to 7;
TAVSM = the average of NEU(i,j) for i=2 to 5, and j=3 to 6;
XTF = the maximum value of NEU(i,j) for i=0 to 7, and j=1 to 8;
ZTF = the minimum value of NEU(i,j) for i=0 to 7, and j=1 to 8;
ZLG = the minimum value of NEU(i,j) for i=1 to 6, and j=2 to 7;
XSM = the maximum value of NEU(i,j) for i=2 to 5, and j=3 to 6;
ZSM = the minimum value of NEU(i,j) for i=2 to 5, and j=3 to 6;
BTF = the average value of B(i,j) for i=0 to 7, and j=1 to 8;
RXTF = the maximum value of R(i,j) for i=0 to 7, and j=1 to 8;
RXLG = the maximum value of R(i,j) for i=1 to 6, and j=2 to 7;
RX1 = the maximum value of R(i,j) for i=0 to 3, and j=1 to 4;
RX2 = the maximum value of R(i,j) for i=0 to 3, and j=5 to 8;
RX3 = the maximum value of R(i,j) for i=4 to 7, and j=1 to 4; and
RX4 = the maximum value of R(i,j) for i=4 to 7, and j=5 to 8.

Thereafter, block 820 calculates the neutral transfer density in accordance with the following equations:

if (XTF − ZTF < 1.0), then TDNEU is given by:

$$TDNEU = .5051 + .9265(TAVLG + TAVSM)/2 + \quad (10)$$
$$.3124((RXTF + RXLG)/2 - BTF) +$$
$$.4668((XTF + XSM)/2 - (TAVLG + TAVSM)/2) -$$
$$.2807((TAVLG + TAVSM)/2 - (ZTF + ZLG)/2)$$

otherwise, if (XTF − ZTF < 1.4), then TDNEU is given by:

$$TDNEU = .5020 + .9610((TAVTF + TAVSM)/2) + \quad (11)$$
$$.3879((RXTF + RXLG)/2 - BTF) +$$
$$.2886((XTF + XSM)/2 - (TAVTF + TAVSM)/2) -$$
$$.2549((TAVTF + TAVSM)/2 - (ZTF + ZLG)/2)$$

otherwise, TDNEU is given by:

$$TDNEU = .6367 + .9077(TAVLG + TAVSM)/2 + \quad (12)$$
$$.3627((RX1 + RX2 + RX3 + RX4)/4 - BTF) +$$
$$.1851((TAVLG + TAVSM)/2 - (ZTF + ZSM)/2).$$

Now, once the value of the neutral transfer density has been determined, execution proceeds to block 830. This block, when executed, determines the green-magenta transfer density (GRMTD) and illuminant transfer density (ILLTD) as weighted averages of the results of pre-defined function, $f_5$ and $f_6$, respectively, of all the green-magenta and illuminant local average values. Specifically, for each value of GRM(i,j), block 830 first calculates the variable GRMBIN(i,j) based upon a comparison between the value of GRM(i,j) and the values stored in an array GRMVAL. The array GRMVAL contains eleven values (in array locations 0-10): −0.300, −0.225, −0.175, −0.125, −0.075, −0.025, 0.025, 0.25, 0.075, 0.150, 0.225 and 0.300. The value of variable GRMBIN(i,j) is given by the following equation:

$$GRMBIN(i,j) = \begin{array}{ll} 0 & \text{if } GRM(i,j) < GRMVAL(0) \\ k & \text{if } GRMVAL(k-1) \leq GRM(i,j) < GRMVAL(k) \\ 11 & \text{if } GRMVAL(10) \leq GRM(i,j). \end{array} \quad (13)$$

where: k is an index with a value running between 0 and 11.

Thereafter, for each value of ILL(i,j), block 830 calculates the variable ILLBIN(i,j) based upon a comparison between the value of ILL(i,j) and the values stored in an array ILLVAL. The array ILLVAL contains thirteen values (in array locations 0-12): −0.68, 0.52, −0.40, 0.28, 0.20, −0.12, −0.04, 0.04, 0.12, 0.20, 0.32, 0.44 and 0.60. The value of variable ILLBIN(i,j) is given by the following equation:

$$ILLBIN(i,j) = \begin{array}{ll} 0 & \text{if } ILL(i,j) < ILLVAL(0) \\ k & \text{if } ILLVAL(k-1) \leq ILL(i,j) < ILLVAL(k) \\ 13 & \text{if } ILLVAL(12) \leq ILL(i,j) \end{array} \quad (14)$$

where: k is an index with a value running between 0 and 13.

With the value of GRMBIN(i,j) and ILLBIN(i,j) calculated for all green-magenta and illuminant local averages, block 830 uses particular weighting coefficients given in the 12-by-14 matrices, GRMAT and ILLMAT, in the calculation of the green-magenta and illuminant transfer densities, where:

GRMAT =
.000, .000, .000, .000, .000, .000, .000, .000, .000, .000,
.000, .000, .000, .000
.000, .000, .000, .000, .000, .000, .000, .000, .000, .000,
.000, .000, .000, .000
.000, .000, .000, .000, .001, .004, .006, .006, .007, .004,
.001, .000, .000, .000
.000, .000, .000, .004, .024, .068, .097, .100, .092, .058,
.016, .001, .000, .000
.000, .000, .004, .030, .131, .297, .392, .399, .358, .232,
.078, .008, .000, .000
.000, .002, .019, .099, .315, .595, .754, .784, .707, .479,
.179, .021, .000, .000
.000, .002, .027, .134, .384, .707, .937, 1.00, .908, .671,
.294, .042, .000, .000
.000, .001, .015, .078, .241, .496, .743, .872, .867, .748,
.392, .065, .001, .000
.000, .000, .004, .020, .074, .178, .315, .449, .527, .501,
.277, .046, .001, .000
.000, .000, .000, .002, .009, .024, .052, .089, .115, .106,
.054, .008, .000, .000
.000, .000, .000, .000, .000, .000, .001, .003, .003, .002,
.000, .000, .000, .000
.000, .000, .000, .000, .000, .000, .000, .000, .000, .000,
.000, .000, .000, .000; and ILLMAT =
.000, .000, .000, .000, .000, .000, .000, .000, .000, .000,
.000, .000, .000, .000
.000, .000, .000, .000, .016, .021, .029, .033, .025, .000,
.000, .000, .000, .000
.000, .000, .047, .077, .140, .201, .244, .295, .335, .315,
.224, .106, .000, .000
.000, .034, .103, .203, .333, .443, .522, .590, .622, .560,
.395, .191, .037, .000
.000, .091, .203, .348, .514, .654, .760, .839, .846, .738,
.522, .263, .052, .000
.000, .165, .314, .467, .627, .770, .891, .974, .964, .832,
.598, .325, .100, .000
.000, .198, .358, .502, .647, .793, .920, 1.00, .990, .868,
.651, .388, .152, .000
.000, .169, .308, .436, .577, .730, .862, .948, .962, .888,
.714, .448, .160, .000
.000, .110, .212, .310, .438, .580, .706, .806, .847, .813,
.684, .435, .118, .000
.000, .064, .120, .175, .264, .367, .469, .556, .585, .555,
.467, .296, .053, .000
.000, .000, .000, .036, .096, .157, .217, .257, .247, .189,
.124, .072, .000, .000
.000, .000, .000, .000, .000, .000, .000, .000, .000, .000,
.000, .000, .000, .000.

With these two matrices, block 830 calculates the green-magenta and illuminant transfer densities as a weighted average of the green-magenta and illuminant local averages, as specified by the following two equations:

GRMTD = weighted average of all GRM(i,j) with
weights given by GRMAT[GRMBIN(i,j),
ILLBIN(i,j)]            (15)

ILLTD = weighted average of all ILL(i,j) with
weights given by ILLMAT[GRMBIN(i,j),
ILLBIN(i,j)].            (16)

At this point, execution proceeds to block 840 which calculates the red and blue printing density offset correction values, $O_{dens}(R)$ and $O_{dens}(B)$, as pre-defined functions, $f_7$ and $f_9$, of the neutral, green—magenta and illuminant transfer densities and the green printing density offset correction value, $O_{dens}(G)$, as a pre-defined function, $f_8$, of the neutral and green-magenta transfer densities. These functions are given by the following three equations:

$$O_{dens}(R) = AIM - ((2 \cdot NEUTD*\sqrt{3}) + (GRMTD*\sqrt{6}) - (3*ILLTD*\sqrt{2}))/6 \quad (17)$$

$$O_{dens}(G) = AIM - (-(NEUTD*\sqrt{3}) - (GRMTD*\sqrt{6}))/3 \quad (18)$$

$$O_{dens}(B) = AIM - ((2 \cdot NEUTD*\sqrt{3}) + (GRMTD*\sqrt{6}) + (3*ILLTD*\sqrt{2}))/6 . \quad (19)$$

where: AIM is a constant intensity value to which all pixel values will tend to equal when these offset values are used. Hence, it is set to provide an overall brightness appropriate to the display medium being used. In a film to print transfer system, these three offset values would ordinarily be used to appropriately reduce the intensity of a photographic printing lamp. Here, however, in a film to video transfer system, the three offset values are instead added to the respective red, green and blue digital color values.

Now, once the RGB offset correction values have been calculated, execution exits from routine 800 and appropriately returns to Main Program 700.

The inventive system has been described as not using a frame store memory and therefore requiring fifteen successive scans of the transparency to obtain the necessary RGB log exposure color values that are needed to fabricate all the log exposure local average values. However, those skilled in the art will readily realize that a frame store memory could easily be incorporated into the inventive apparatus at the output of chroma interpolator gate array 230 (see FIGS. 2A-2D), in a manner well known in the art, to store re-constructed RGB log exposure color values that result from one scan of the transparency and then repetitively access that data for use in both fabricating the log exposure local average values and then for providing subsequent color balancing of the image formed by that stored RGB data. While use of a frame store might eliminate the need for some of the required image scans and hence provide some increase in system throughput, use of the frame store memory disadvantageously increases system cost and complexity.

Clearly, by now, those skilled in the art will also recognize that although the inventive automatic color balancing apparatus, as discussed above, is directed to transferring images from photographic transparencies to video, the inventive apparatus could be used in color balancing photographic images from motion picture film to video, particularly for recording on video tape. In this case, the film handling equipment would need to be appropriately changed in a well-known fashion to accommodate motion picture film instead of slides. The inventive method technique would remain the same with the printing density domain color balancing technique, specifically that implemented within routine 800, being suitably adjusted, if necessary, to accommodate the particular chromatic response of motion picture film. Here, the individual frames could be color balanced in two ways: either the color offset correction values for each frame in the motion picture film could be separately determined and then subsequently used in color balancing that frame, or the color correction offset values for only the first frame in each different scene in the film could be determined and then subsequently used in color balancing all the frames in that scene. Ancillary audio equipment would also be used to appropriately transfer (dub) a sound track from the motion picture film onto the video tape.

Although one embodiment of the present invention has been shown and described herein, many other varied embodiments that contain the teachings of the present invention may be easily constructed by those skilled in the art.

What is claimed is:

1. A system for automatically controlling the brightness of an optical image which is translated into digital samples corresponding to the pixels constituting said image, which system comprises:
   a variable area aperture through which said image is transmitted for digitization into said samples,
   means for varying the area of said aperture,
   peak detecting means for detecting a plurality of peak values of said samples,
   means for determining the percentage of said plurality of peak values which are above a certain threshold value;
   comparison means for comparing said percentage with a predetermined level; and
   means responsive to said comparison means for operating said aperture area varying means until the percentage of said peak values which are above said threshold value reaches said predetermined level.

2. The system of claim 1 wherein said operating means comprises:
   means operative when said percentage is below said predetermined level for iteratively causing said varying means to open said aperture thereby increasing the area thereof, and
   means operative when said percentage is above said predetermined level for iteratively causing said varying means to close said aperture thereby decreasing the area thereof.

3. The system according to claim 1 further comprising:
   means for sub-dividing said digital samples into groups obtained from paxels, said paxels consisting essentially of contiguous groups of pixels arranged in a plurality of columns and rows of said pixels,
   said peak detecting means comprising means for detecting the peak pixel value in each row of each of said paxels.

4. The system according to claim 3 wherein said predetermined level is 3%.

5. The system according to claim 4 wherein each of said digital samples represents an individual value lying in the range of 0 to 255 in given units of light intensity and wherein said threshold value is 240 in given units of light intensity.

6. In a film to video transfer system in which an optical image is translated into digital samples corresponding to pixels constituting said image, said image being divisible into contiguous paxels comprising rows and columns of groups of said pixels, each of said pixels representing one of a plurality of color components, said system including a color corrector which generates color correction signals for each of said color components from local average pixel values obtained from corresponding paxels, an automatic brightness controller comprising;
   a variable area aperture through which said image is transmitted for digitization into said samples,
   means for varying the area of said aperture,
   means for detecting a peak value of said samples in each one of said paxels so as to detect a plurality of peak values;
   means for determining the proportion of said plurality of peak values which are above a certain threshold value;
   means for comparing said proportion with a predetermined ratio; and
   means responsive to said comparing means for operating said aperture area varying means until said proportion of said peak values which are above said threshold value is said predetermined ratio.

7. The system of claim 6 wherein said means for detecting comprises means for detecting a peak value in each pixel row of each one of said paxels.

8. The system of claim 6 wherein said means for operating comprises:
   means operative when said proportion is below said predetermined ratio for iteratively causing said varying means to open said aperture thereby increasing the area thereof, and
   means operative when said proportion is above said predetermined ratio for iteratively causing said varying means to close said aperture thereby decreasing the area thereof.

* * * * *